(12) United States Patent
Miura et al.

(10) Patent No.: US 7,848,659 B2
(45) Date of Patent: Dec. 7, 2010

(54) OPTICAL TRANSMITTING APPARATUS AND OPTICAL COMMUNICATION SYSTEM

(75) Inventors: Akira Miura, Kawasaki (JP); Kentaro Nakamura, Kawasaki (JP); Hiroshi Onaka, Kawasaki (JP); Yuichi Akiyama, Kawasaki (JP); Hiroki Ooi, Kawasaki (JP); Jens Rasmussen, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 11/298,892

(22) Filed: Dec. 12, 2005

(65) Prior Publication Data

US 2007/0065161 A1   Mar. 22, 2007

(30) Foreign Application Priority Data

Sep. 16, 2005   (JP)   ............................. 2005-270235

(51) Int. Cl.
 *H04B 10/04*   (2006.01)
(52) U.S. Cl. ................. 398/188; 398/187; 398/186; 398/185; 398/183
(58) Field of Classification Search ................. 398/188, 398/187, 186, 183, 185, 202–211
See application file for complete search history.

(56) References Cited

U.S. PATENT DOCUMENTS

| | | | | |
|---|---|---|---|---|
| 4,780,764 A | * | 10/1988 | Kinoshita et al. | ........... 348/296 |
| 5,170,274 A | | 12/1992 | Kuwata et al. | |
| 5,202,745 A | * | 4/1993 | Sorin et al. | ................. 356/73.1 |
| 5,408,544 A | | 4/1995 | Seino | |
| 5,528,695 A | * | 6/1996 | Klippel | ........................ 381/55 |
| 5,666,194 A | * | 9/1997 | Denton | ........................ 356/72 |
| 5,703,642 A | * | 12/1997 | Stevens | ....................... 348/317 |
| 5,717,510 A | | 2/1998 | Ishikawa et al. | |
| 5,805,321 A | | 9/1998 | Ooi et al. | |
| 5,862,139 A | * | 1/1999 | Yanagi | ....................... 370/441 |

(Continued)

FOREIGN PATENT DOCUMENTS

EP   1 168 041 A2   1/2002

(Continued)

OTHER PUBLICATIONS

Extended European search report; Application No. 05027380-1246; Reference No. 112 486 a/km; dated Jan. 14, 2008; 6-pages.

(Continued)

*Primary Examiner*—Ken N Vanderpuye
*Assistant Examiner*—Hibret A Woldekidan
(74) *Attorney, Agent, or Firm*—Fujitsu Patent Center

(57) ABSTRACT

A data modulator unit generates a DQPSK optical signal in accordance with a data signal. A phase shift unit provides a phase difference of $\pi/2$ between a pair of arms. A photodetector converts an output signal of the data modulator unit into an electrical signal. A filter is a low-pass filter with a cut-off frequency lower than a symbol frequency, and filters an output signal of the photodetector. A monitor unit detects power of an output signal of the filter. A phase difference control unit adjusts the amount of phase shift in the phase shift unit so as to minimize power of an output signal of the filter.

19 Claims, 32 Drawing Sheets

U.S. PATENT DOCUMENTS

| | | | |
|---|---|---|---|
| 5,917,628 A | 6/1999 | Ooi et al. | |
| 5,953,466 A | 9/1999 | Kubota et al. | |
| 6,097,525 A | 8/2000 | Ono et al. | |
| 6,278,539 B1 | 8/2001 | Ooi et al. | |
| 6,396,605 B1 | 5/2002 | Heflinger et al. | |
| 6,407,845 B2* | 6/2002 | Nakamoto | 359/239 |
| 6,510,255 B2 | 1/2003 | Masuda et al. | |
| 6,730,899 B1* | 5/2004 | Stevens et al. | 250/208.1 |
| 6,836,622 B2 | 12/2004 | Kobayashi et al. | |
| 6,972,842 B2* | 12/2005 | Doerr et al. | 356/364 |
| 7,116,460 B2* | 10/2006 | Griffin | 359/245 |
| 7,233,399 B2* | 6/2007 | Schlenk et al. | 356/477 |
| 7,266,306 B1* | 9/2007 | Harley et al. | 398/182 |
| 7,333,736 B2* | 2/2008 | Sardesai et al. | 398/201 |
| 7,492,404 B2* | 2/2009 | Stevens et al. | 348/314 |
| 7,657,190 B2* | 2/2010 | Akiyama | 398/195 |
| 2001/0019361 A1* | 9/2001 | Savoye | 348/222 |
| 2004/0028418 A1 | 2/2004 | Kaplan et al. | |
| 2004/0081470 A1 | 4/2004 | Griffin | |
| 2005/0002675 A1 | 1/2005 | Sardesai et al. | |
| 2005/0088659 A1 | 4/2005 | Schlenk et al. | |
| 2005/0100281 A1* | 5/2005 | Kim et al. | 385/39 |
| 2005/0117191 A1* | 6/2005 | Griffin | 359/245 |
| 2005/0238115 A1* | 10/2005 | Hasegawa et al. | 375/298 |
| 2006/0250509 A1* | 11/2006 | Koshiba | 348/272 |
| 2006/0263097 A1* | 11/2006 | Akiyama et al. | 398/188 |

FOREIGN PATENT DOCUMENTS

| | | |
|---|---|---|
| EP | 1 524 548 A1 | 4/2005 |
| JP | 6-289342 A | 10/1994 |
| JP | H7-199133 | 8/1995 |
| JP | 8-248365 A | 9/1996 |
| JP | H8-321805 | 12/1996 |
| JP | H9-80363 | 3/1997 |
| JP | 2642499 | 5/1997 |
| JP | H9-261207 | 10/1997 |
| JP | H10-112688 | 4/1998 |
| JP | H10-228006 | 8/1998 |
| JP | 2000-162563 | 6/2000 |
| JP | 2001-27746 | 1/2001 |
| JP | 2001-244896 | 9/2001 |
| JP | 2002-23122 | 1/2002 |
| JP | 2002-23124 | 1/2002 |
| JP | 2004-511128 | 4/2004 |
| JP | 2004-516743 | 6/2004 |
| JP | 2004-318052 | 11/2004 |
| WO | 02/27994 | 4/2002 |
| WO | 02/51041 A2 | 6/2002 |
| WO | 03/049333 | 6/2003 |
| WO | 03/049333 A | 6/2003 |

OTHER PUBLICATIONS

Japanese Notice of Rejection dated Jan. 6, 2009 for Japanese Application No. 2005-270235. (A partial English-language translation is provided.).

Japanese Office Action for Japanese Application No. 2005-270235 mailed Nov. 10, 2009. A partial English-language translation is provided.

JPO—Japan Patent Office, Official Action mailed Sep. 28, 2010, in connection with correspondent JP patent application No. 2005-270235. English-language translation.

* cited by examiner

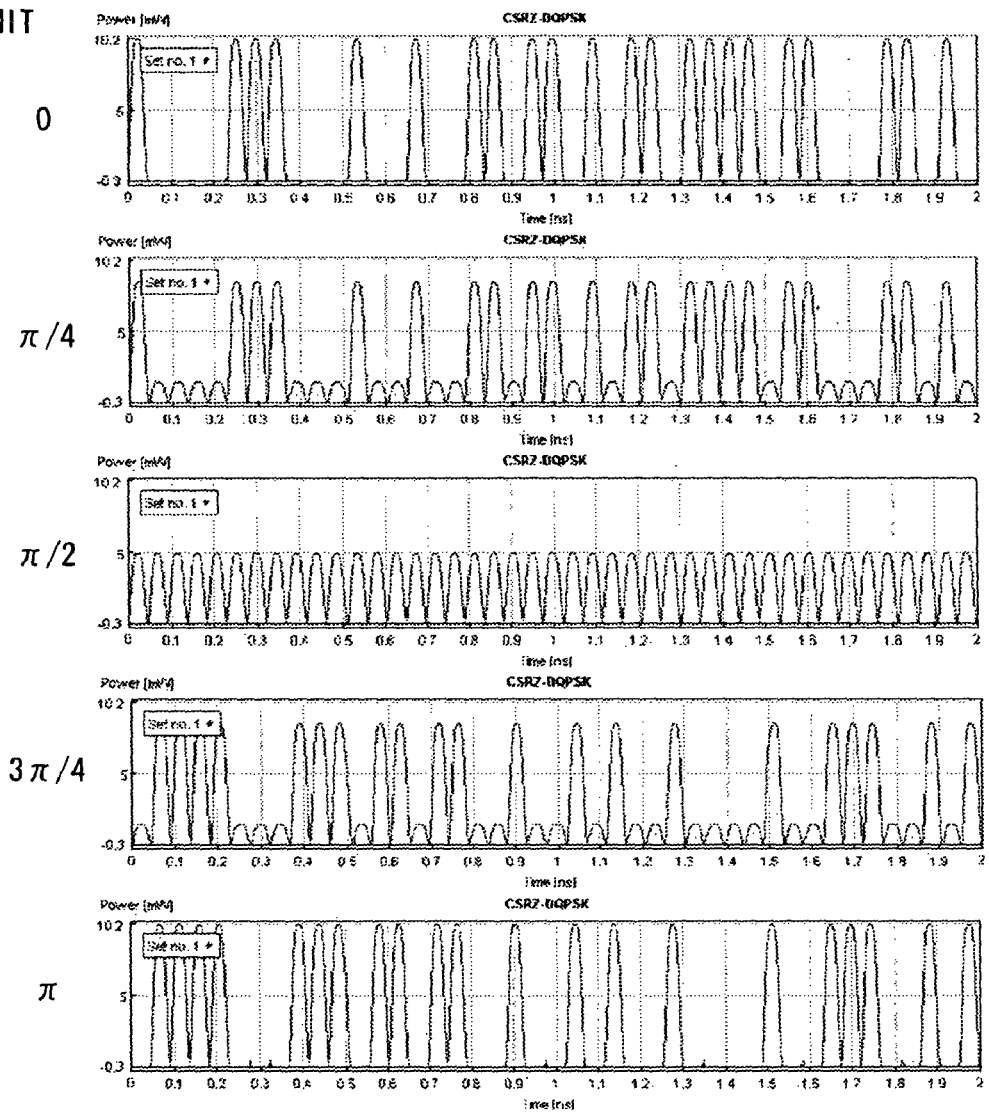
F I G. 6 A

PHASE IN PHASE SHIFT UNIT
0
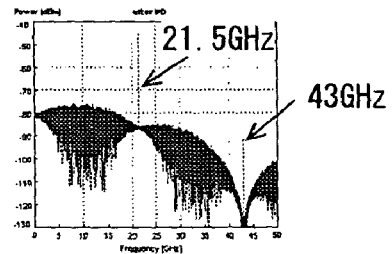
π/4
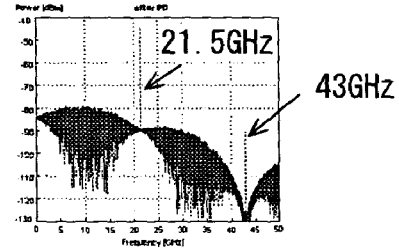
π/2
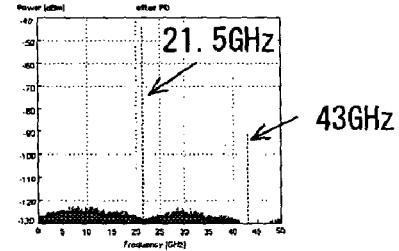
3π/4
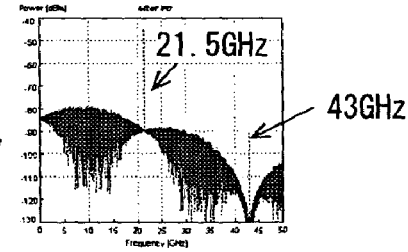
π
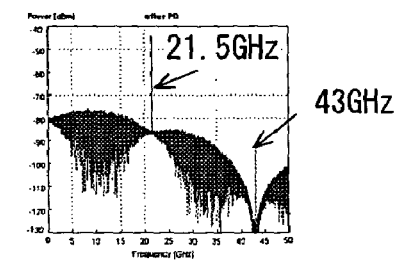
FIG. 6B

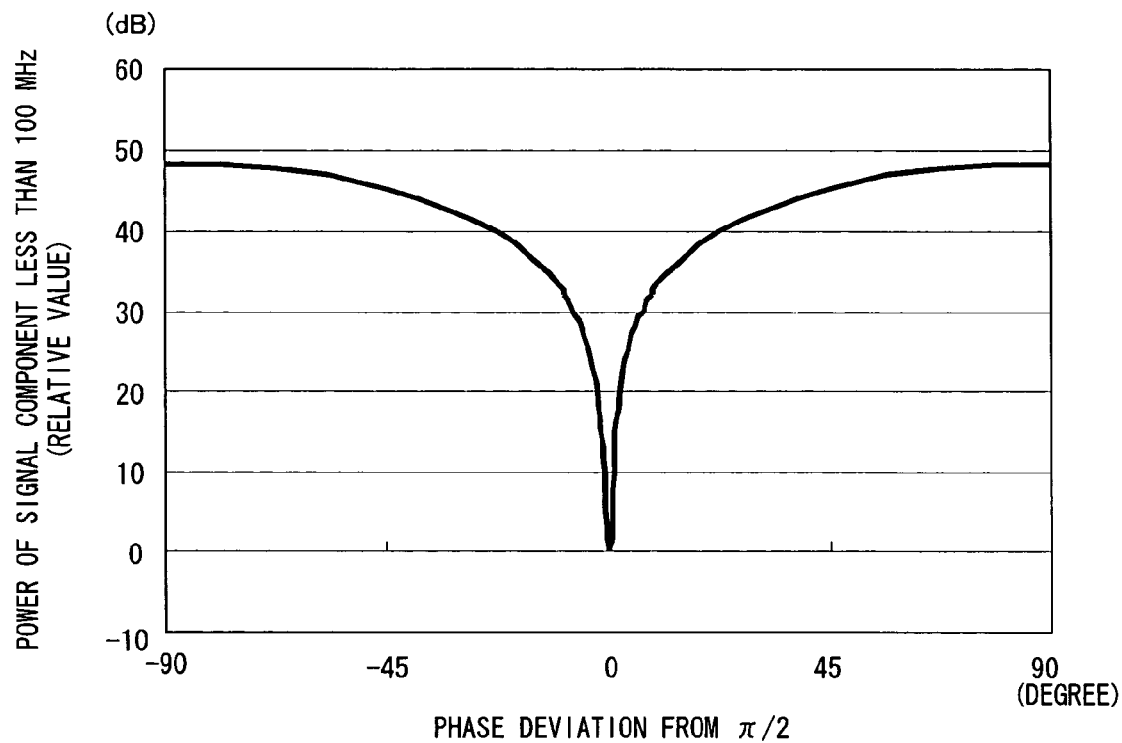
F I G. 7

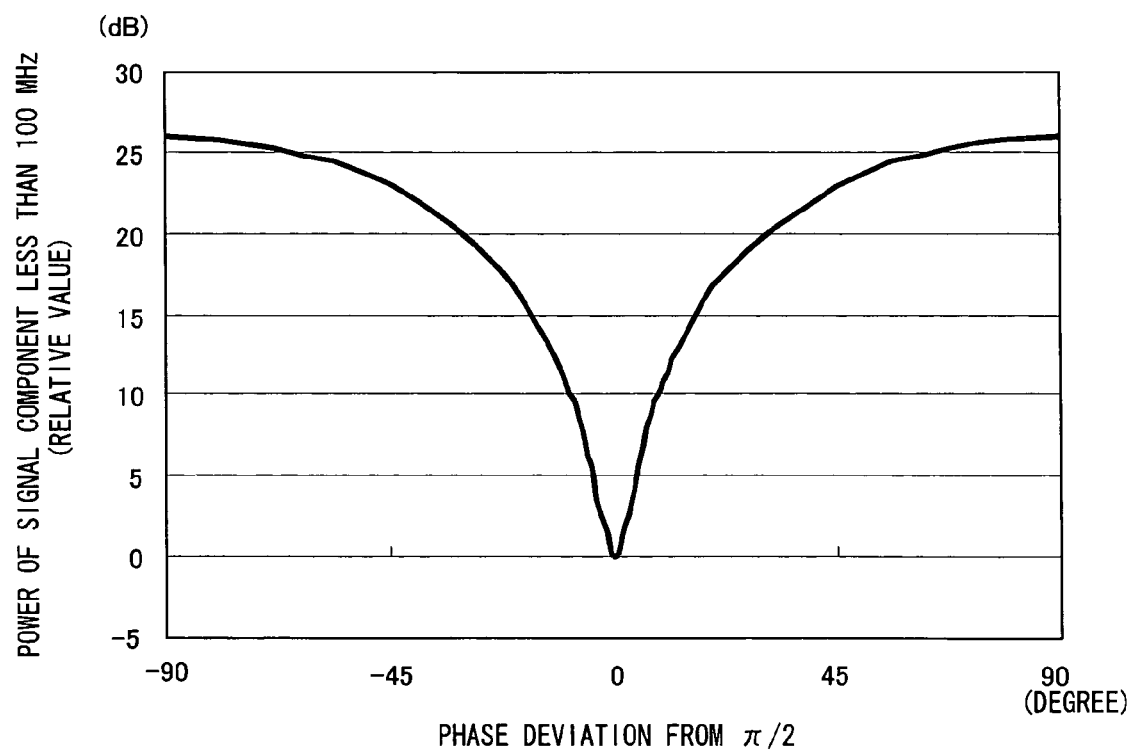
F I G. 9

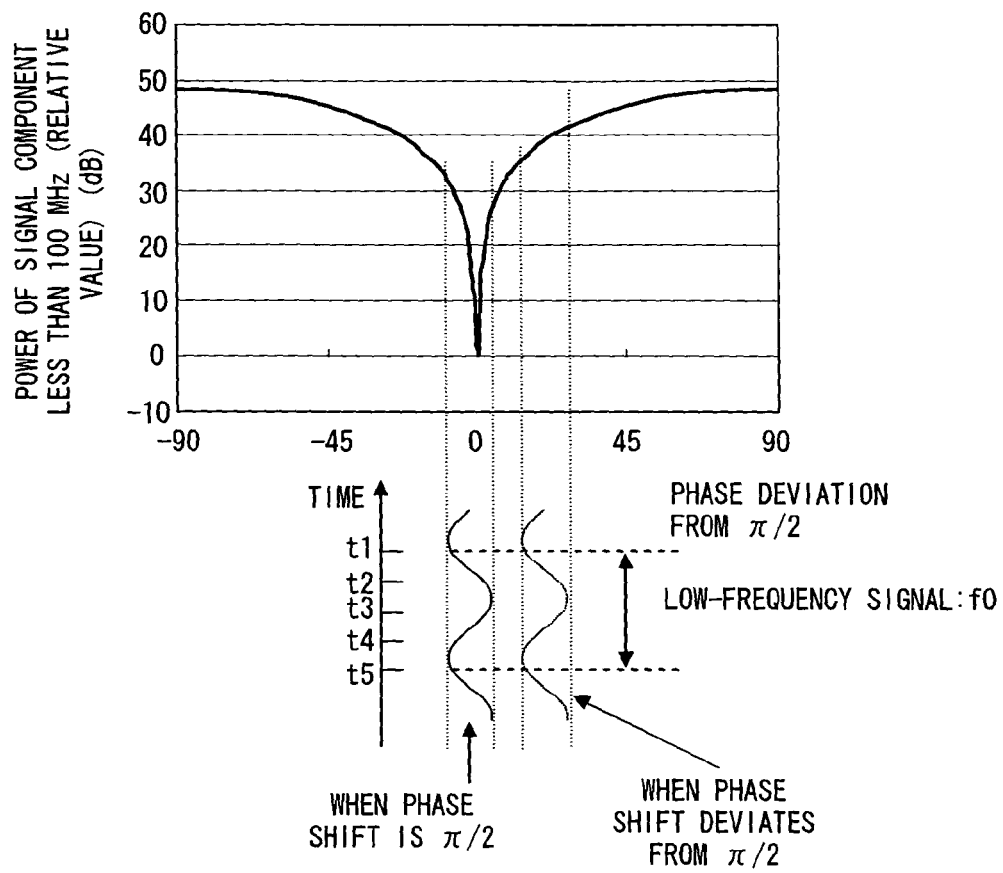
FIG. 12A
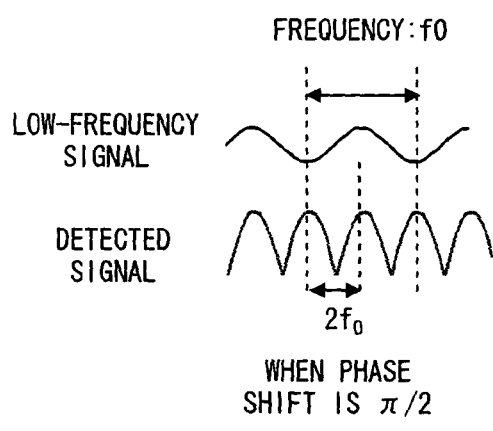 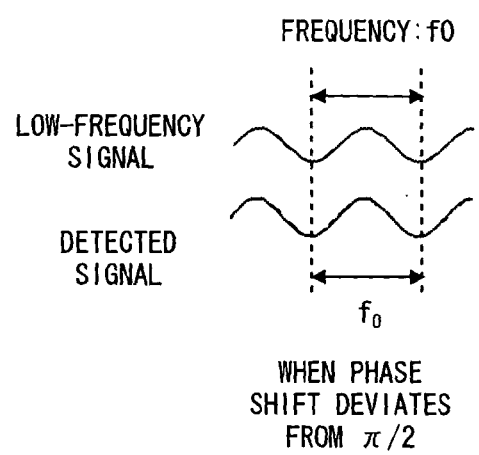
FIG. 12B  FIG. 12C

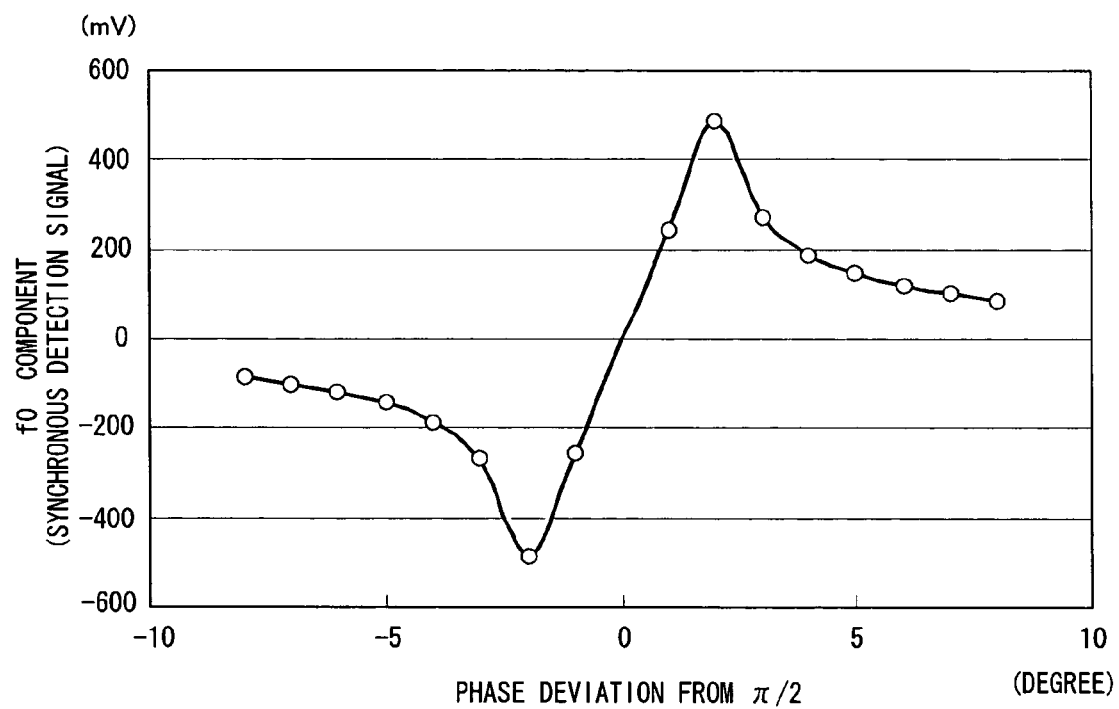
F I G. 1 3

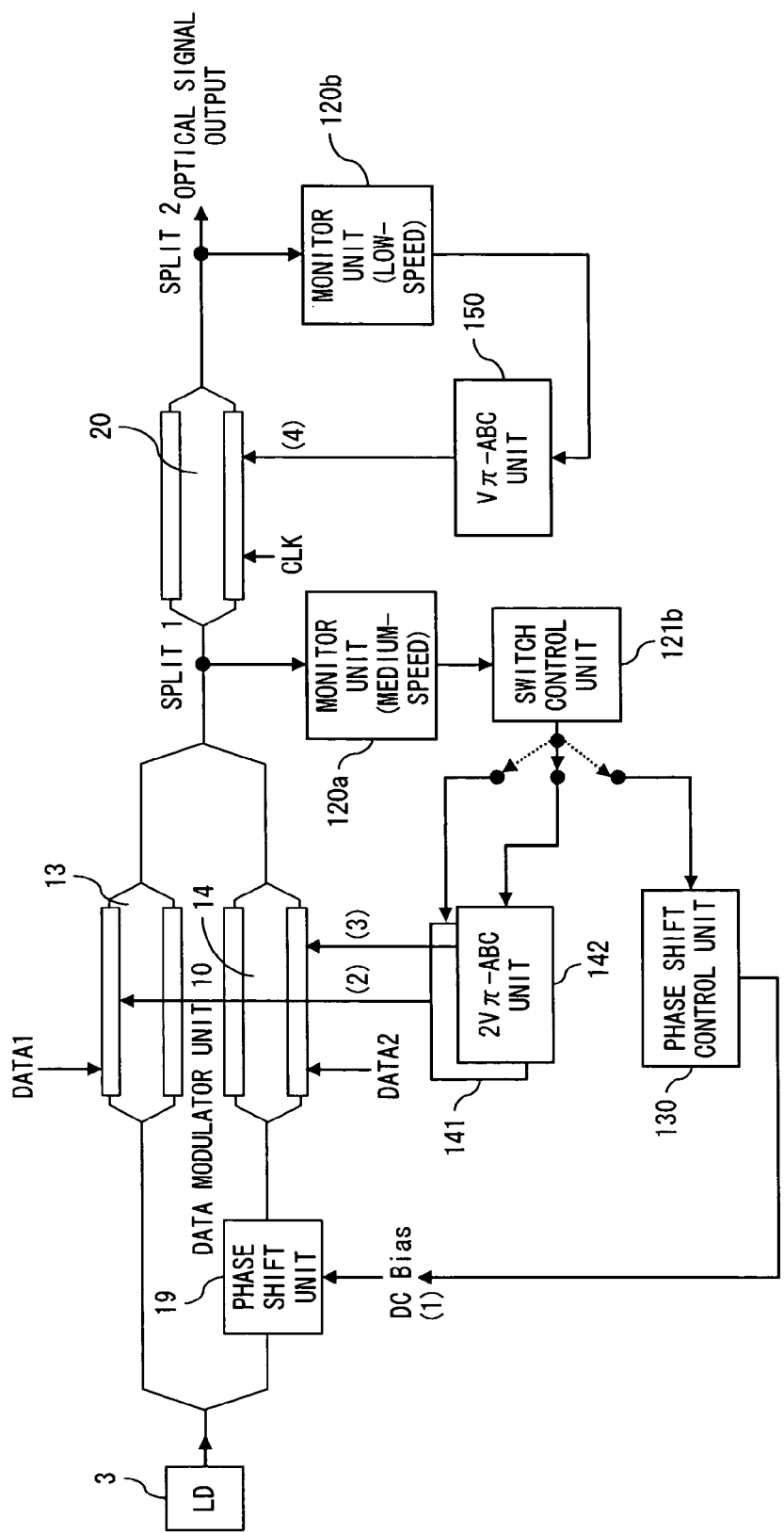
F I G. 22

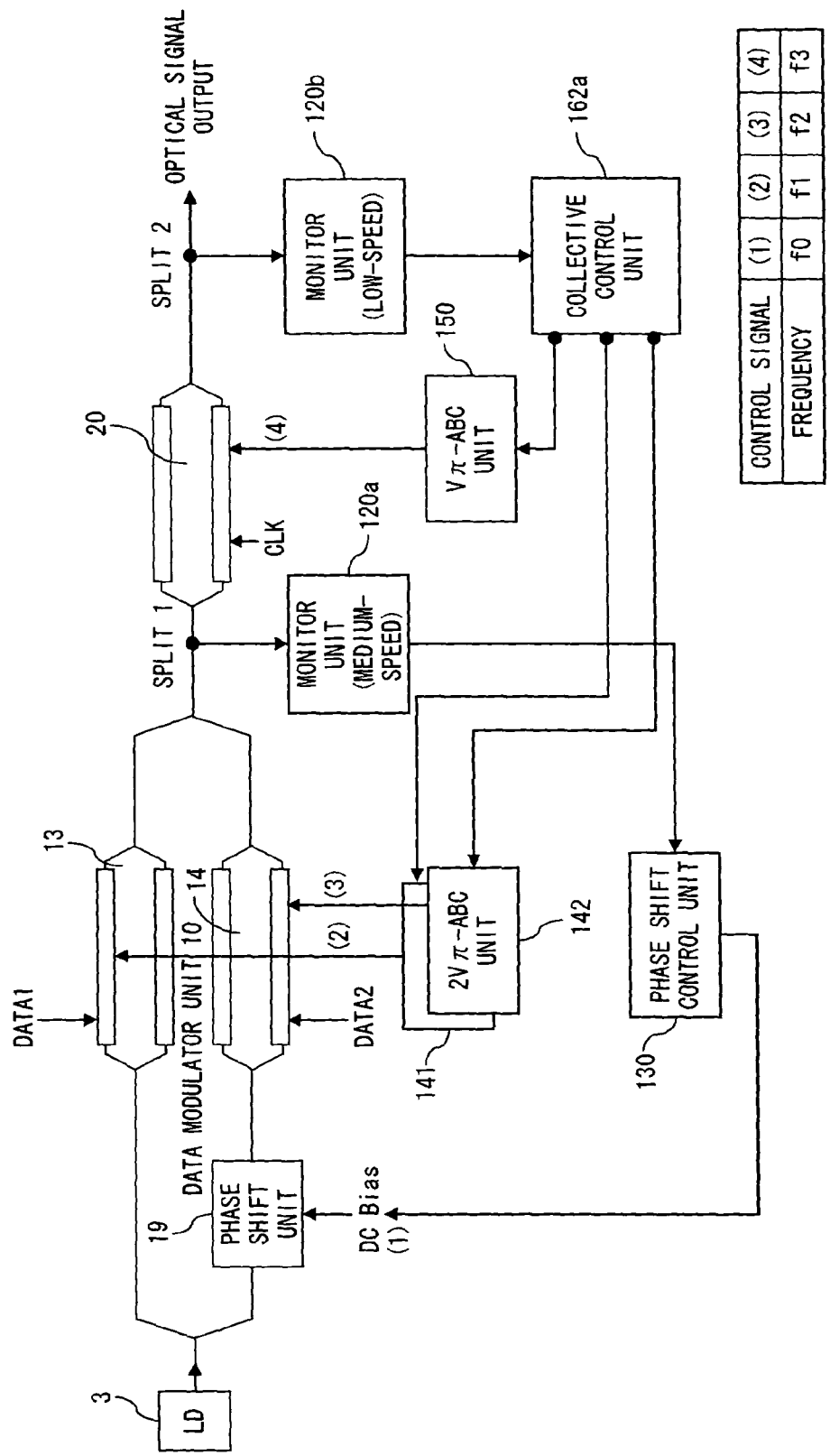
F I G. 2 5

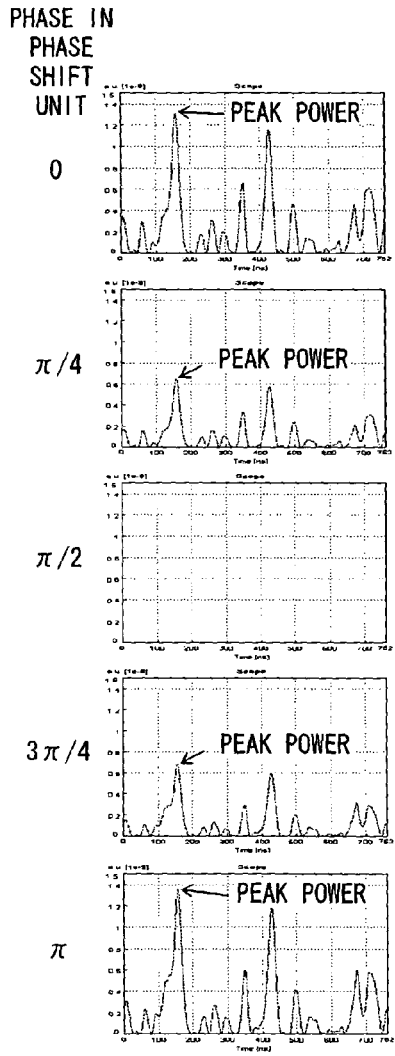
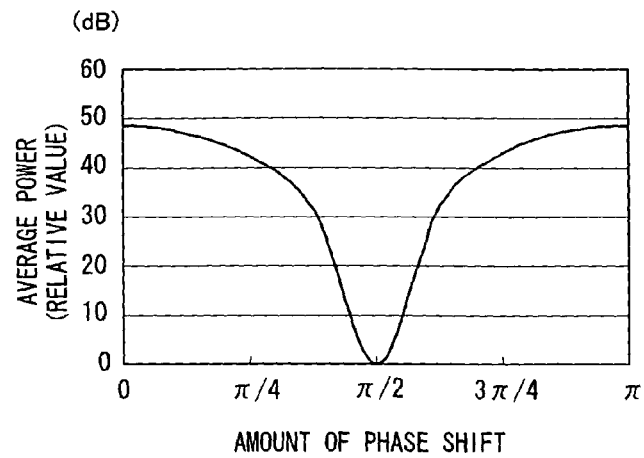
FIG. 30B
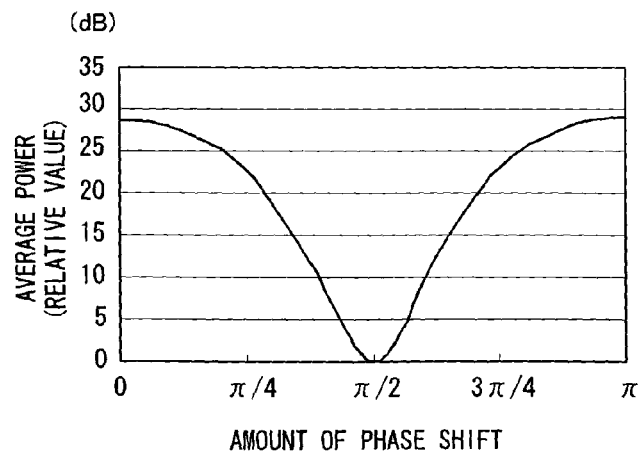
FIG. 30A
FIG. 30C

OPTICAL TRANSMITTING APPARATUS AND OPTICAL COMMUNICATION SYSTEM

BACKGROUND OF THE INVENTION

1. Field of the Invention

The present invention relates to an optical transmitting apparatus and an optical communication system, and in particular, relates to optical transmitting apparatus for transmitting an optical signal using PSK modulation and an optical communication system comprising such optical transmitting apparatus.

2. Description of the Related Art

Development of a practical implementation of an optical transmitting apparatus aiming to establish a high capacity and long distance optical transmission system has been awaited in recent years. Particularly, expectations for implementation of an optical transmitting apparatus, which employs an optical modulation technique adequate for high capacity and long-distance, to an actual system are growing high. In order to meet with expectations, optical transmission systems using phase shift keying such as DPSK (Differential Phase Shift Keying) and DQPSK (Differential Quadrature Phase Shift Keying) are envisioned.

FIG. 1 is a diagram showing a configuration of optical transmitting apparatus, which is heretofore known, for transmitting a QPSK signal or a DQPSK signal. In optical transmitting apparatus 2000 shown in FIG. 1, an optical source (LD) 2001 generates an optical continuous wave (CW). An optical splitter 2002 splits the optical CW and guides to arms 2003 and 2004. In the arms 2003 and 2004, phase modulators 2005 and 2006 are configured respectively. Both phase modulators 2005 and 2006 are Mach-Zehnder interferometers. The phase modulator 2005 performs phase modulation of the optical CW using data 1, and the phase modulator 2006 performs phase modulation of the optical CW using data 2. In DQPSK, the data 1 and data 2 are encoded by a DQPSK pre-coder. An optical coupler 2007 couples modulated signals obtained from the phase modulators 2005 and 2006. A phase shifter 2008 causes the phase difference of $\pi/2$ between an optical signal guided to the optical coupler 2007 via the arm 2003 and an optical signal guided to the optical coupler 2007 via the arm 2004. By the above configuration, a QPSK optical signal or a DQPSK optical signal is generated. Details of the configuration and the operation of DQPSK optical transmitting apparatus are described, for example, in Patent Document 1 (Japanese Patent Application Laid-open Publication No. 2004-516743 (WO2002/051041 or US2004/0081470)).

As a related art, Patent Document 2 (Japanese Patent Application Laid-open Publication No. 2004-318052) describes a technology for appropriately correcting DC bias in each optical modulator unit of SSB (Single Side-Band) optical modulator apparatus comprising a plurality of the optical modulator units, during normal operation of the modulator. In the SSB optical modulator apparatus also, a phase shifter for causing the phase difference of $\pi/2$ in optical signals propagated in a pair of arms is configured.

As other related arts, Patent documents 3 (Japanese Patent Application Laid-open Publication No. H03-251815) and Patent document 4 (Japanese Patent Application Laid-open Publication No. H09-261207) describe a configuration to adjust the operation of modulator apparatus by using a low-frequency signal.

In the optical transmitting apparatus shown in FIG. 1, it is necessary for the amount of phase shift provided by the phase shifter 2008 ("$\pi/2$" in the QPSK and the DQPSK) to be set accurately to attain favorable reception quality. However, the amount of phase shift may sometimes deviate from a prescribed value due to thermal change and aged degradation etc.

Nevertheless, in the conventional technologies, a configuration for adjusting the amount of phase shift of the phase shifter in response to thermal change or aged degradation etc. has not been suggested.

SUMMARY OF THE INVENTION

It is an object of the present invention to provide a configuration, which allows appropriate adjustment of the amount of phase shift in an optical transmitting apparatus comprising a phase modulator.

The optical transmitting apparatus of the present invention, which transmits a modulated optical signal corresponding to a data signal, comprising: a phase shift unit for controlling a phase of at least one of a first optical signal and a second optical signal, obtained by splitting an optical input, so that the first and the second optical signals have a prescribed phase difference on an optical waveguide; a data modulator unit for modulating the first and second optical signals using the data signal on the optical waveguide; an extraction unit for extracting at least a part of a frequency component except for a frequency, which is an integral multiple of a symbol frequency, from a modulated optical signal obtained by coupling the first and the second optical signals modulated by the data modulator unit; and a phase difference control unit for controlling the phase shift unit based on the frequency component extracted by the extraction unit.

In the above optical transmitting apparatus, if the amount of phase shift in the phase shift unit deviates from an appropriate value, a frequency component other than the frequency, which is an integral multiple of the symbol frequency, increases in the modulated optical signal. Therefore, by monitoring the frequency component other than the frequency, which is an integral multiple of the symbol frequency, the amount of phase shift can be appropriately adjusted.

The other aspect of the optical transmitting apparatus of the present invention comprises: a phase shift unit for controlling a phase of at least one of a first optical signal and a second optical signal, obtained by splitting an optical input, so that the first and the second optical signals have a prescribed phase difference on an optical waveguide; a data modulator unit for modulating the first and second optical signals using the data signal on the optical waveguide; a superimposing unit for superimposing a low-frequency signal on at least one of the first and the second optical signals; an extraction unit for extracting at least a part of a frequency component except for a frequency, which is an integral multiple of a symbol frequency, from the modulated optical signal obtained by coupling the first and the second optical signals modulated by the data modulator unit, a detection unit for detecting at least one of an amplitude or a phase of a low-frequency signal or its harmonic signal comprised in the frequency component extracted by the extraction unit, and a phase difference control unit for controlling the phase shift unit based on the detection result of the detection unit.

In the above optical transmitting apparatus, if the amount of phase shift in the phase shift unit is appropriately set, a frequency component, which is twice of the frequency of the low-frequency signal, is comprised in the modulated optical signal. Therefore, by monitoring that frequency component, the amount of phase shift can be appropriately adjusted. On the other hand, when the amount of phase shift deviates from the appropriate value, a frequency component of the low-frequency signal is comprised in the modulated optical signal.

At that time, a phase of the low-frequency signal detected from the modulated optical signal when the amount of phase shift deviates in a positive direction, is inverted from a phase of the low-frequency signal detected from the modulated optical signal when the amount of phase shift deviates in a negative direction. Therefore, by monitoring the phase of the low-frequency signal, the amount of phase shift can be appropriately adjusted.

According to the present invention, the amount of phase shift of a phase shifter element in a phase modulator comprised in the optical transmitting apparatus is appropriately adjusted, therefore, deterioration of communication quality can be avoided. Particularly, when deviation of the amount of phase shift occurs due to thermal change, aged degradation etc., the amount of phase shift is dynamically adjusted appropriately, thus it is possible to constantly avoid the deterioration of communication quality.

BRIEF DESCRIPTION OF THE DRAWINGS

FIG. 6A and FIG. 6B are simulation results of the waveform and the spectrum of the output signal of the intensity modulator;

FIG. 7 is a diagram showing a relation between the filter output power and the amount of phase shift when the output signal of the intensity modulator is monitored;

FIG. 9 is a diagram showing the relation between the filter output power and the amount of phase shift when the output signal of the data modulator unit is monitored;

FIG. 12A-FIG. 12C are diagrams explaining the principle of an adjustment method of the amount of phase shift in the second embodiment;

FIG. 13 is a diagram describing a relation between the $f_0$ component and the phase deviation when the output signal of the intensity modulator is monitored;

FIG. 21 through FIG. 23 are first through third example implementations of the sixth configuration, respectively;

FIG. 25 through FIG. 27 are first through third example implementations of the seventh configuration, respectively;

FIG. 30A is a diagram showing a waveform of the squared signal;

FIG. 30B is a diagram showing the relation between the amount of phase shift and average power of the squared signal; and FIG. 30C is a diagram showing the relation between the amount of phase shift and the peak power of the squared signal.

DESCRIPTION OF THE PREFERRED EMBODIMENTS

In the following description, the preferred embodiments of the present invention are set forth with reference to the drawings.

Figure 1:
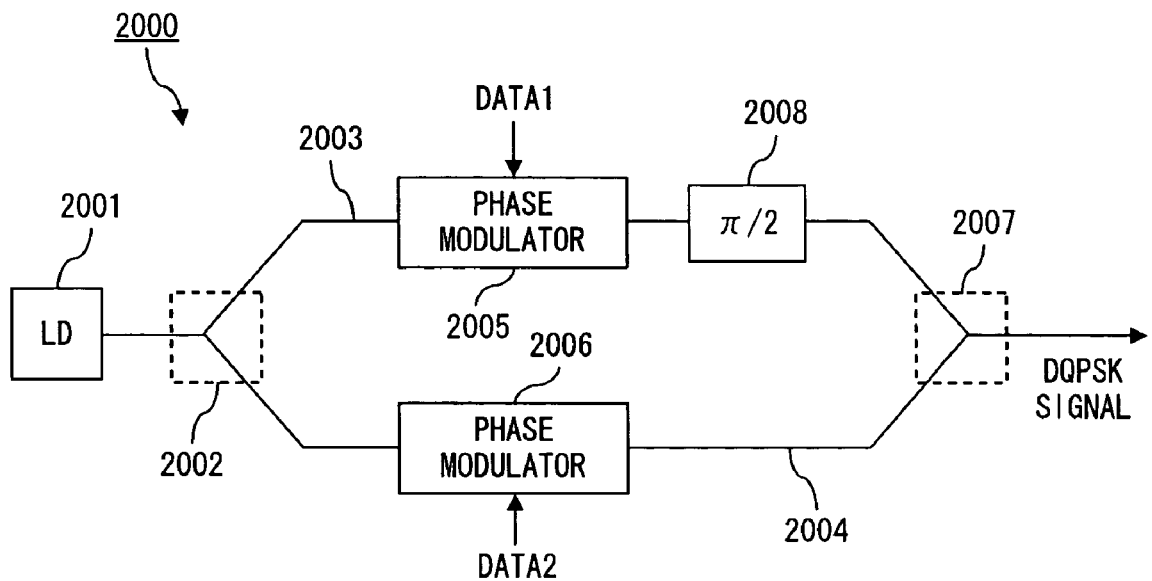
FIG. 1 is a diagram showing a configuration of conventional optical transmitting apparatus for transmitting a QPSK signal or a DQPSK signal.
Figure 2:
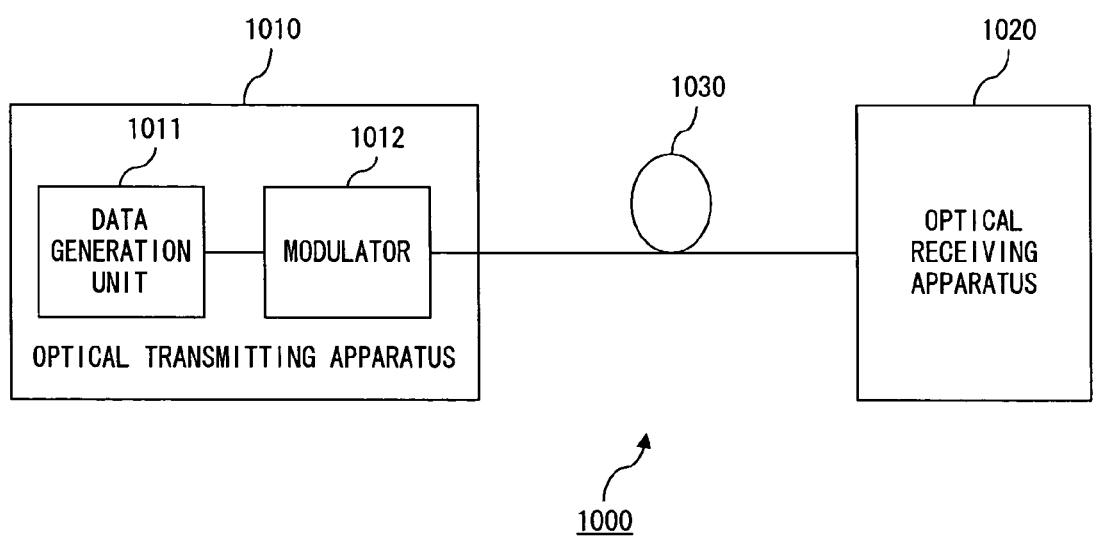
FIG. 2 is a diagram showing a configuration of an optical communication system relating to the embodiments of the present invention.

FIG. 2 is a diagram showing a configuration of an optical communication system relating to the preferred embodiments of the present invention. An optical communication system 1000 shown in FIG. 2 comprises an optical transmitting apparatus 1010, an optical receiving apparatus 1020, and a transmission optical fiber 1030 for connecting between them. The optical transmitting apparatus 1010 comprises a data generation unit 1011 and a modulator 1012. The data generation unit 1011 generates data to be transmitted. The modulator 1012 generates a modulated optical signal using the data generated by the data generation unit 1011. In this case, the modulation method is not limited in particular but is the DQPSK, for example. The optical receiving apparatus 1020 obtains data by demodulating an optical signal transmitted via the transmission optical fiber 1030. An optical amplifier or an optical repeater can be provided on the transmission optical fiber 1030.

Figure 3:
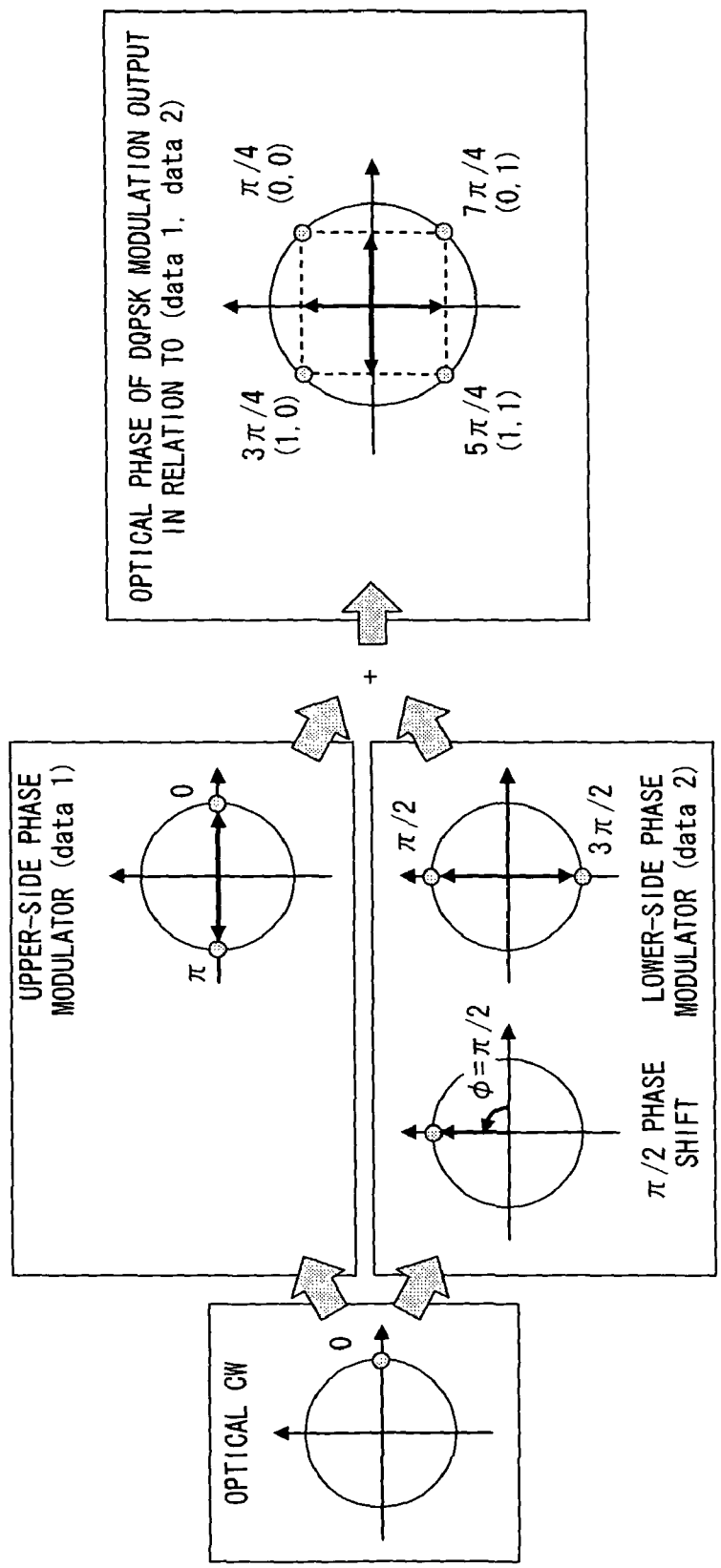
FIG. 3 is a diagram explaining the principle of the DQPSK modulation.

FIG. 3 is a diagram explaining the principle of the DQPSK (or QPSK) modulation. In the DQPSK modulation, two-bit data (data 1, data 2) is transmitted as one symbol. Here, each symbol is assigned with a phase corresponding to a combination of the data (data 1, data 2). In the example shown in FIG. 3, "π/4" is assigned to the symbol (0, 0), "3π/4" is assigned to the symbol (1,0), "5π/4" is assigned to the symbol (1,1), and "7π/4" is assigned to the symbol (0,1). Therefore, the optical receiving apparatus can recover data by detecting the phase of the received signal.

In order to achieve the above phase modulation, an optical CW (Continuous Wave) is split into two, and one of the split light is phase-modulated by the data 1 and the other split light is phase-modulated by the data 2. Then, the phase assigned to the data 2 is shifted by "π/2" with respect to the phase assigned to the data 1. In other words, a device to generate π/2-phase shift is required in the DQPSK modulation.

Figure 4:
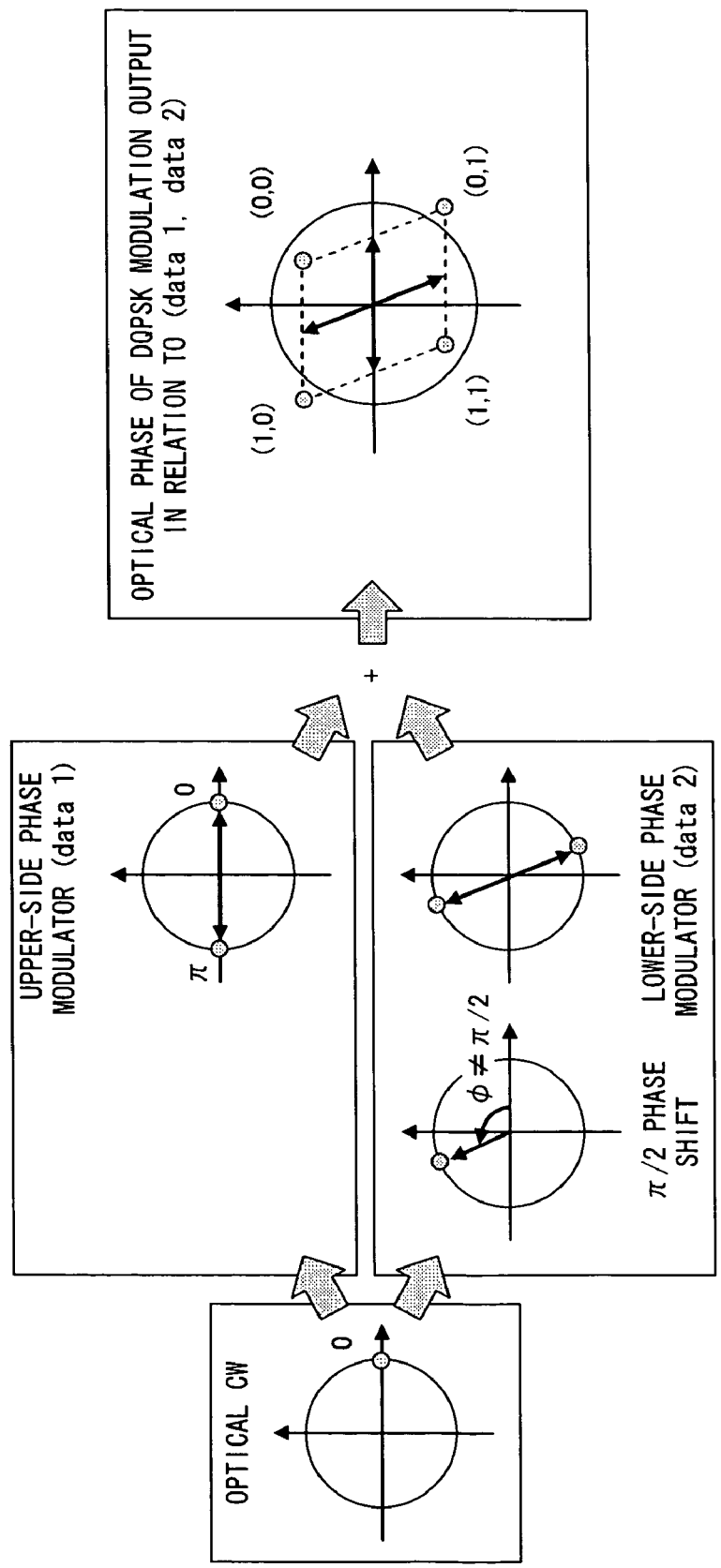
FIG. 4 is a diagram explaining deterioration of communication quality in the DQPSK modulation.

FIG. 4 is a diagram explaining deterioration of communication quality in the DQPSK modulation. An optical transmitting apparatus employing the DQPSK modulation, as described above, comprises a device for generating π/2-phase shift. However, when the amount of phase shift deviates from π/2 due to thermal change or aged degradation etc., the positions of each symbol on a phase plane also deviate, as shown in FIG. 4, and the possibility of erroneous data recognition increases in an optical receiving apparatus. Therefore, in order to improve the communication quality of the DQPSK modulation system, it is important to maintain high accuracy of the π/2-phase shift device.

First Embodiment

Figure 5:
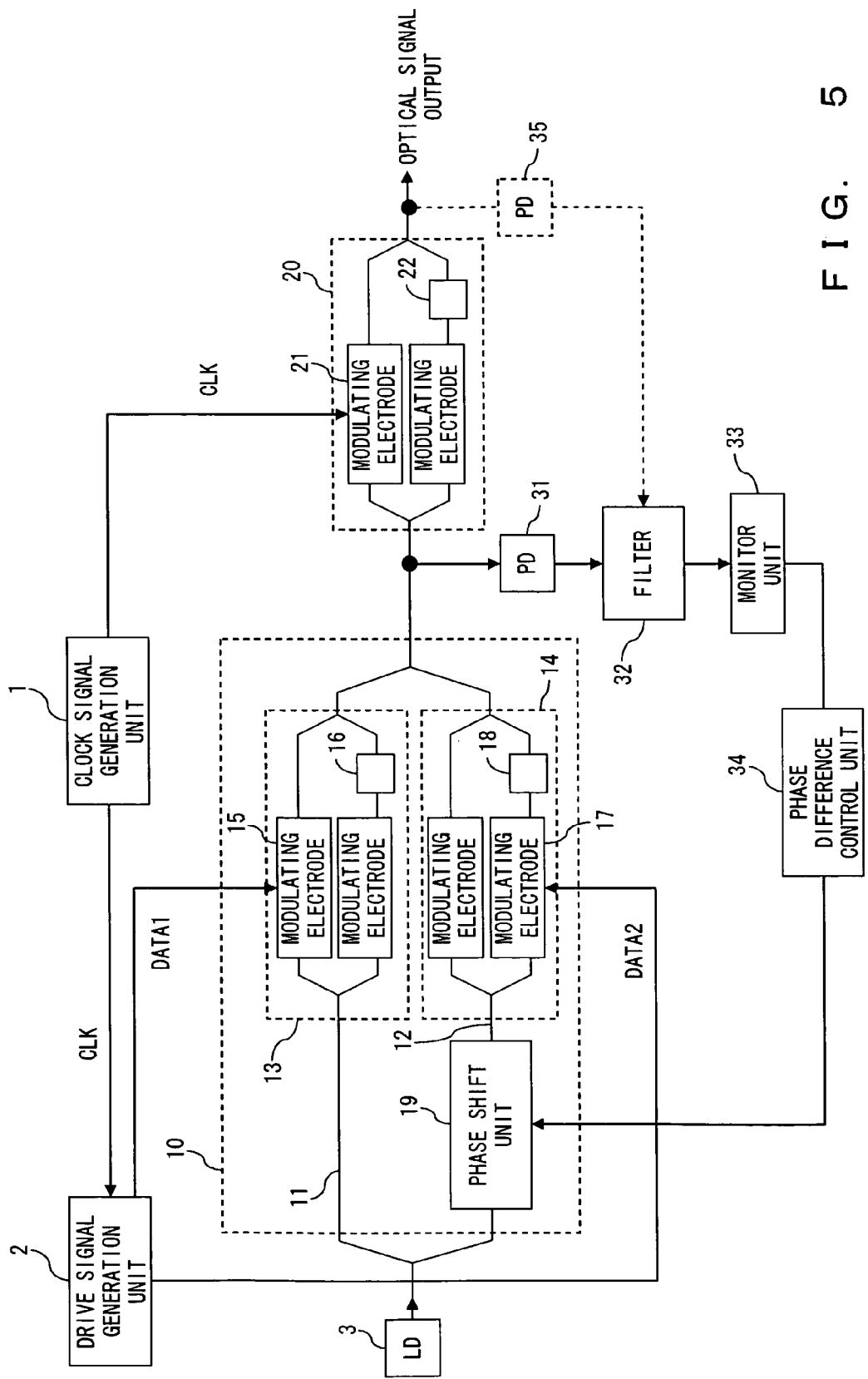
FIG. 5 is a diagram describing a configuration of the optical transmitting apparatus of the first embodiment of the present invention.

FIG. 5 is a diagram describing a configuration of the optical transmitting apparatus of the first embodiment of the present invention. This optical transmitting apparatus generates and transmits a DQPSK optical signal in the following description.

In FIG. 5, a clock signal generation unit 1 generates a clock signal. The frequency of the clock signal is, for example, a symbol frequency. In this case, if the bit rate of the transmitted data is 43 Gbps, the symbol frequency is 21.5 GHz. A drive signal generation unit 2 generates data signals DATA1 and DATA2 for generating a modulated optical signal. Here, the data signals DATA1 and DATA2 can be obtained by encoding the transmission data using a DQPSK pre-coder. An optical source (LD) 3 is a semiconductor laser, for example, and generates an optical CW. The wavelength of the optical CW is not limited in particular; however, 1550 nm band is used for example.

A data modulator unit 10 generates a DQPSK optical signal by modulating the optical CW using the data signals DATA1 and DATA2, as explained with reference to FIG. 3. The data modulator unit 10 is an interferometer, and comprises an optical splitter for splitting the input optical CW, a pair of optical waveguides (an arm 11 and an arm 12) for propagating a pair of optical signals obtained by the optical splitter, and an optical coupler for coupling the optical signals propagated via the pair of the optical waveguides. On the arm 11 and the arm 12, phase modulators 13 and 14 are configured respectively. Both phase modulators 13 and 14 are for example Mach-Zehnder interferometers. The phase modulator 13 comprises a modulating electrode 15 to which the data signal DATA1 is provided, and the phase modulator 14 comprises a modulating electrode 17 to which the data signal DATA2 is provided. The phase modulators 13 and 14 modulate the optical CW using the data signals DATA1 and DATA2, respectively. Each of the phase modulators 13 and 14 comprises bias input units 16 and 18, respectively, to which a bias signal for compensating for DC drift is provided.

A phase shift unit 19 gives a prescribed phase difference to a pair of optical signals propagated via the arms 11 and 12. The "prescribed phase difference" is, in the DQPSK, "nπ/2 (where n is an arbitrary odd number)". The phase shift unit 19, for example, by changing an optical length of an optical waveguide constituting the arm 12, adjusts the phase of an optical signal transmitted in the optical waveguide. The phase shift unit 19, for example, is a heater for adjusting the optical length by changing the temperature in a part of the optical waveguide constituting the arm 12.

An intensity modulator 20 is a Mach-Zehnder interferometer, for example, and comprises a modulating electrode 21 to which a clock signal is provided, and a bias input unit 22 to which a bias signal for compensating for a DC drift is provided. The intensity modulator 20 modulates a DQPSK optical signal generated by the data modulator unit 10 by an intensity modulation (optical RZ modulation), using the clock signal. By so doing, an RZ-DQPSK signal is generated.

The RZ-DQPSK signal can be obtained by lowering optical power of the DPSK signal in a period equivalent to the symbol rate.

When an LN ($LiNbO_3$) modulator is used as the data modulator unit 10 and the intensity modulator 20, because the LN modulator has a polarization dependency, a polarization maintaining optical fiber may be used for the connections between the optical source 3 and the data modulator unit 10, and between the data modulator unit 10 and the intensity modulator 20. It is desirable that a configuration using a polarization maintaining optical fiber is applied, basically, to all embodiments.

A Photodetector (PD) 31 converts a part of the DQPSK optical signal output from the data modulator unit 10 into an electrical signal. The photodetector 31 is a high-speed photodiode (or a phototransistor etc.), of which the cut-off frequency is a symbol frequency or higher, for example. A filter 32 extracts prescribed frequency components from the output signal of the photodetector 31. Specifically, the filter 32 is a filter, which passes at least a part of contiguous frequency components except for an N-fold frequency of the symbol frequency (where N is an integer including 1), and is a band-pass filter or a low-pass filter with the cut-off frequency lower than the symbol frequency. A monitor unit 33 detects the power of the output signal of the filter 32.

A phase difference control unit 34 adjusts the amount of phase shift in the phase shift unit 19 based on the detection result of the monitor unit 33 (i.e. a signal indicating the power of the output signal of the filter 32). When the phase shift unit 19 comprises a heater for changing the temperature of the optical waveguide, the phase difference control unit 34 adjusts electrical current to be provided to the heater based on the detection result of the monitor unit 33. In the above configuration, it is possible to set a photodetector 35, instead of a photodetector 31, for converting a part of the RZ-DQPSK optical signal output from the intensity modulator 20 into an electrical signal. In such a case, the filter 32 extracts prescribed frequency components from the output signal of the photodetector 35.

FIG. 6A is a simulation result of the relation between the amount of phase shift in the phase shift unit 19 and the waveform of the output signal of the intensity modulator 20. FIG. 6B is a simulation result of the relation between the amount of phase shift in the phase shift 19 and the spectrum of the output signal of the intensity modulator 20.

As shown in FIG. 6A, if the amount of phase shift in the phase shift unit 19 is exactly "π/2", the output signal of the intensity modulator 20 has a waveform in which an approximately fixed optical power appears in a symbol period. Therefore, in such a case, the output signal of the intensity modulator 20 has large spectra at a symbol frequency component (21.5 GHz in this case) and at its harmonic components (43 GHz etc.), and small spectra at other frequency components. On the other hand, when the amount of phase shift in the phase shift unit 19 deviates from "π/2", as shown in FIG. 6A, the output signal of the intensity modulator 20 has a waveform in which different optical power appears in a random period. Hence, in such a case, the spectrum of the output signal of the intensity modulator 20 comprises various frequencies, as shown in FIG. 6B.

FIG. 7 is a diagram showing a relation between the power of the output signal of the filter 32 and the amount of phase shift when the output signal of the intensity modulator 20 is monitored. Here, the output signal of the photodetector 35 is provided to the filter 32. The filter 32 is a low-pass filter with the cut-off frequency of 100 MHz, and the cut-off frequency of the photodetector 35 is higher than that of the filter 32. In addition, FIG. 7 indicates a relative value on the basis of the minimum power of the output signal of the filter 32. The X-axis of FIG. 7 indicates deviation from "π/2".

When the amount of phase shift in the phase shift unit 19 is exactly "π/2", as stated above, the frequency components other than the symbol frequency component and its harmonic components are small. For that reason, the frequency component other than in such a case, the power detected by the monitor unit 33 reaches its minimum as shown in FIG. 7. On the other hand, when the amount of phase shift deviates from "π/2", the frequency components other than the symbol frequency component and its harmonic components become large. In other words, a high proportion of various frequency components (particularly components with lower frequency than the symbol frequency) are comprised. Therefore, in this case, the power detected by the monitor unit 33 is higher than the power when the amount of phase shift is "π/2", as shown in FIG. 7. At that time, the power is determined in accordance with the amount of deviation from "π/2".

As described above, the power of the output signal of the filter 32 reaches its minimum when the amount of phase shift in the phase shift unit 19 is adjusted to exactly "π/2". Therefore, by performing a feedback control so that the power of the output signal of the filter 32 reaches the minimum, the amount of phase shift in the phase shift unit 19 converges on "π/2".

Figure 8A:
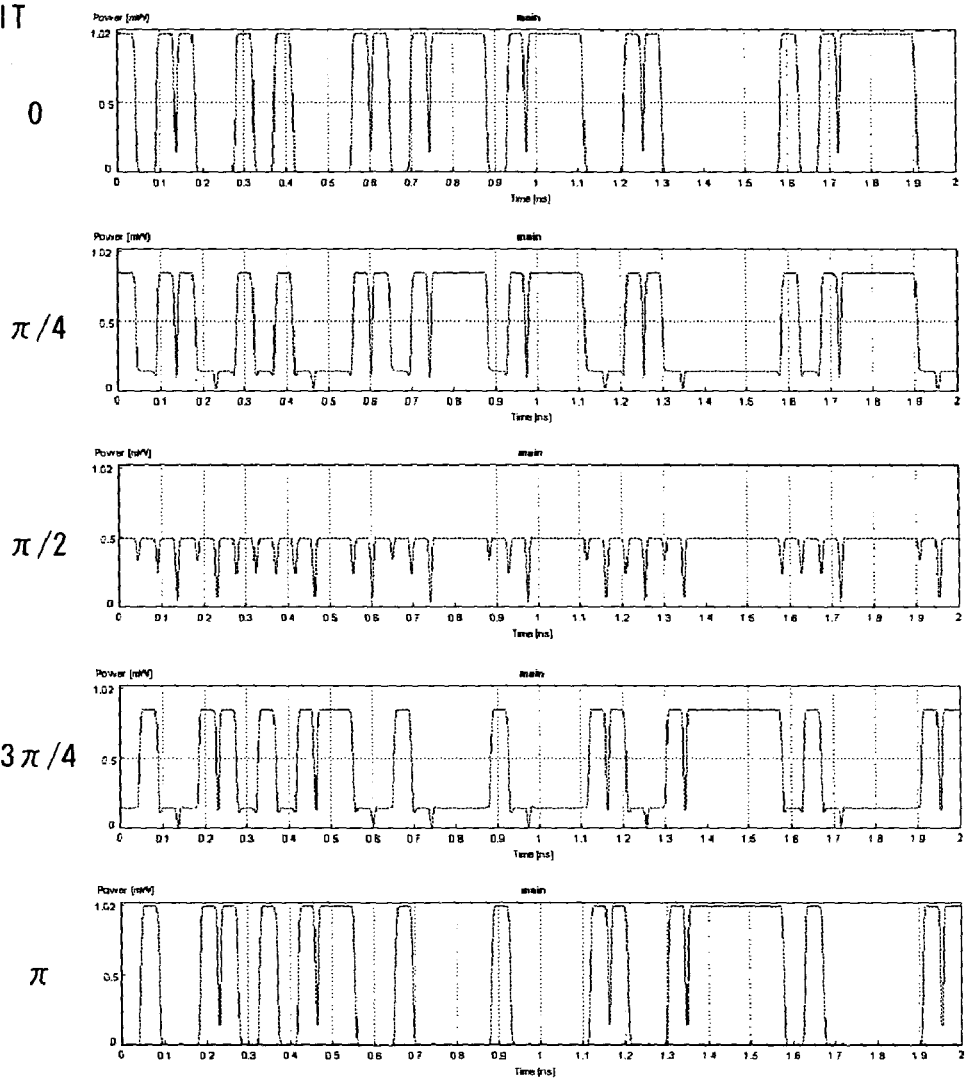
FIG. 8A and FIG. 8B are simulation results of the waveform and the spectrum of the output signal of the data modulator unit.
Figure 8B:
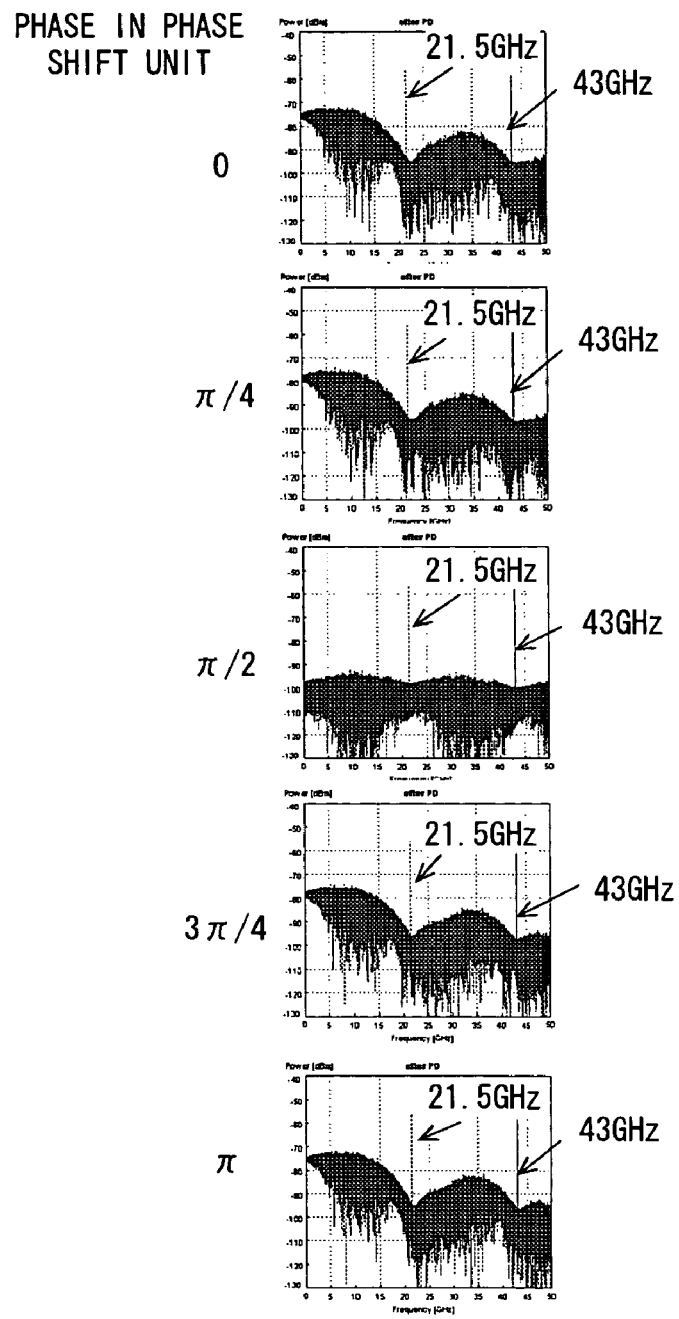

FIG. 8A is a simulation result of the relation between the amount of phase shift in the phase shift unit 19 and the waveform of the output signal of the data modulator unit 10. FIG. 8B is a simulation result of the relation between the amount of phase shift in the phase shift unit 19 and the spectrum of the output signal of the data modulator unit 10. Additionally, FIG. 9 is a diagram showing the relation between the power of the output signal of the filter 32 and the amount of phase shift when the output signal of the data modulator unit 10 is monitored. In other words, the output signal of the photodetector 31 is provided to the filter 32. Like the above example, the filter 32 is a low-pass filter with cut-off frequency of 100 MHz, and the cut-off frequency of the photodetector 31 is higher than that of the filter 32.

As shown in FIG. 8B and FIG. 9, even when the output signal of the data modulator unit 10 is monitored, like the case when the output signal of the intensity modulator 20 is monitored, the frequency components other than the symbol frequency component and its harmonic components become minimum when the amount of phase shift in the phase shift unit 19 is "π/2". Therefore, in this case also, by performing a feedback control so that the power of the output signal of the filter 32 reaches minimum, the amount of phase shift in the phase shift unit 19 converges on "π/2".

As it is clear from the comparison between FIG. 7 and FIG. 9, the power change with respect to the amount of phase shift shows larger and more rapid in the configuration for monitoring the output signal of the intensity modulator 20 than the configuration for monitoring the output signal of the data modulator unit 10. For example, the power change detected by the monitor unit 33, when the amount of phase shift deviated by 5 degrees from "π/2", is less than 10 dB in the configuration for monitoring the output signal of the data modulator unit 10; however it is more than 20 dB in the configuration for monitoring the output signal of the intensity modulator 20. For that reason, the configuration for monitoring the output signal of the intensity modulator 20 is advantageous to accurately adjust the amount of phase shift in the phase shift unit 19. However, because a loss is caused in the intensity modulator 20, the power of the optical signal input to the photodetector 35 drops by the loss. Therefore, which of the photodetectors 31 or 35 is used should be determined in consideration of the optical power at each point in the actual apparatus.

Figure 10:
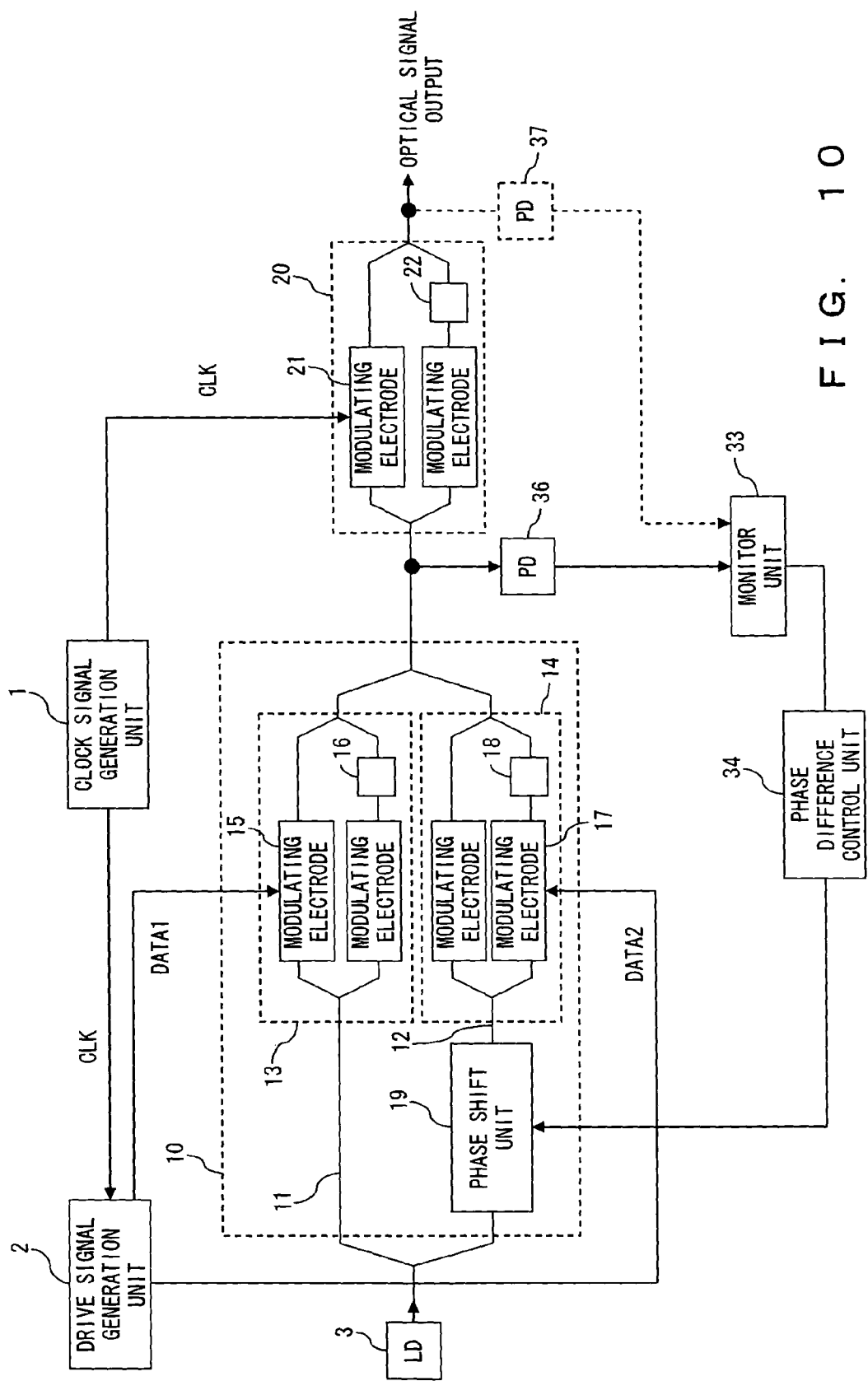
FIG. 10 is a variation of the optical transmitting apparatus of the first embodiment.

FIG. 10 is a variation of the optical transmitting apparatus of the first embodiment. The optical transmitting apparatus shown in FIG. 10 can be realized by replacing the photodetector 31 and the filter 32 comprised in the optical transmitting apparatus shown in FIG. 5 with a photodetector 36 (or by replacing the photodetector 35 and the filter 32 with a photodetector 37). In this example, the photodetectors 36 and 37 are medium-speed photodiodes, for example, and comprises a cut-off frequency lower than the symbol frequency. By so doing, the same function as the optical transmitting apparatus shown in FIG. 5 can be realized. In other words, when the cut-off frequency of the photodetectors 36 and 37 is 100 MHz, characteristics in FIG. 6A-FIG. 9 can be obtained.

Second Embodiment

Figure 11:
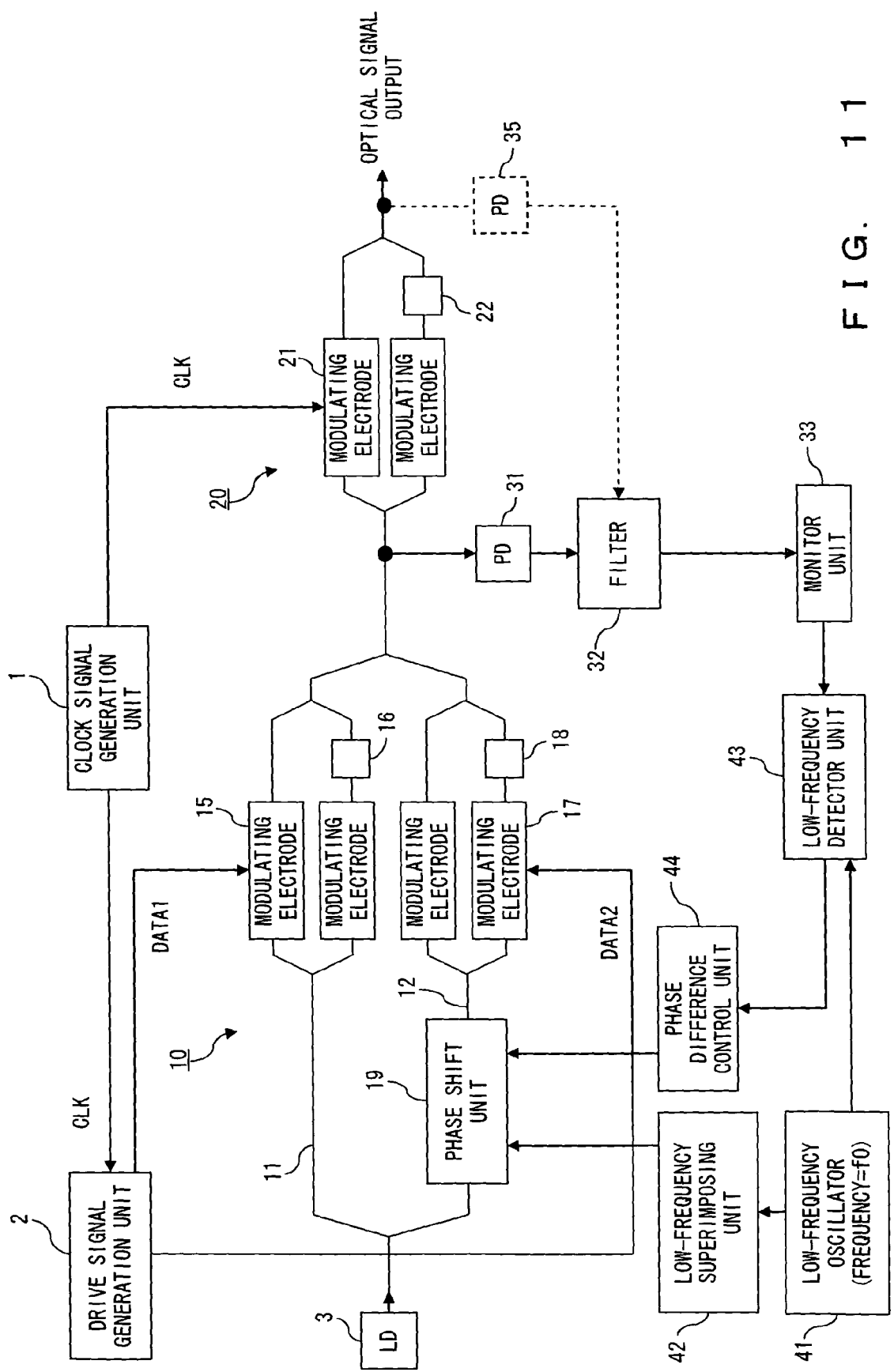
FIG. 11 is a diagram showing a first configuration of an optical transmitting apparatus of the second embodiment of the present invention.

FIG. 11 is a diagram showing a first configuration of an optical transmitting apparatus of the second embodiment of the present invention. In the optical transmitting apparatus of the second embodiment, the amount of phase shift is adjusted using a low-frequency signal. Numerical references shared in FIG. 5 and FIG. 11 indicate the same elements.

A low-frequency oscillator 41 generates a low-frequency signal with several kHz through several MHz. In the following description, the frequency of the low-frequency signal is referred to as "$f_0$". The low-frequency signal is a sinusoidal signal or rectangular wave signal, for example, and its amplitude is so small as not to give adverse effect on optical signals to be transmitted. The low-frequency signal is fed to the phase shift unit 19 via a low-frequency superimposing unit 42. For that reason, the amount of phase shift in the phase shift unit 19 changes (or dithers) on a periodic basis in accordance with the voltage of the low-frequency signal.

A low-frequency detector unit 43 performs synchronous detection of the $f_0$ component signal in the output signal of the monitor unit 33 using the low-frequency signal generated by the low-frequency oscillator 41. Here, the low-frequency detector unit 43 may comprise a low-pass filter or a band-pass filter, which passes the frequency $f_0$. The operation and the configuration of the circuit performing the synchronous detection are heretofore known, and thus explanations of those are omitted. A phase difference control unit 44 adjusts the amount of phase shift of the phase shift unit 19 based on the detection result by the low-frequency detector unit 43 (the phase or the amplitude of the $f_0$ component signal, for example).

FIG. 12A-FIG. 12C are diagrams explaining the principle of an adjustment method of the amount of phase shift in the second embodiment. The power detected by the monitor unit 33, as shown in FIG. 12A, depends on the amount of phase shift in the phase shift unit 19, and becomes minimum when the amount of phase shift is "π/2". The relation shown in FIG. 12A is the same as in FIG. 7.

A low-frequency signal is provided to the phase shift unit 19. Then, the amount of phase shift of the phase shift unit 19 changes at the frequency $f_0$. At that time, the amount of phase shift is "π/2", or is close to "π/2", the amount of phase shift, when the low-frequency signal is provided, periodically changes around a point where the power of the frequency component passing through the filter 32 becomes minimum. For example, within one period of time of the low-frequency signal (time t1-t5), the power of the frequency component passing through the filter 32 changes in the following manner. The time t1: approximately +30 dB (relative value), the time t2: zero (relative value), the time t3: approximately +30 dB (relative value), the time t4: zero (relative value), and the time t5: approximately +30 dB (relative value). That is, in this case, the power of the frequency component passing through the filter 32 periodically changes with a frequency of $2f_0$ as shown in FIG. 12B. Therefore, the output signal of the monitor unit 33 comprises the $2f_0$ component.

On the other hand, when the amount of phase shift deviates from "π/2", the amount of phase shift, when a low-frequency signal is provided, periodically changes in a region away from a point where the power of the frequency component passing through the filter 32 has a minimum value. For example, in the time period of t1-t5, the power of the frequency component passing through the filter 32 changes in the following manner. The time t1: approximately +36 dB (relative value), the time t2: approximately +39 dB (relative value), the time t3: approximately +42 dB (relative value), the time t4: approximately +39 dB (relative value), and the time t5: approximately +36 dB (relative value). That is, in this case the output signal of the monitor unit 33 comprises the $f_0$ component as shown in FIG. 12C; however, does not comprise the $2f_0$ component.

As described above, when the amount of phase shift deviates from "π/2", the $2f_0$ component is not detected. When the amount of phase shift approaches "π/2", the $2f_0$ component is detected from the output signal of the monitor unit 33, in addition that the $f_0$ component is reduced. For that reason, by performing a feedback control on the phase shift unit 19 so that the frequency component $f_0$ detected by the low-frequency detector unit 43 reaches the minimum or that the frequency component $2f_0$ detected by the low-frequency detector unit 43 reaches the maximum, the amount of phase shift can be converged on "π/2".

When the amount of the phase shift deviates in the positive direction, the phase of the $f_0$ component signal output from the monitor unit 33 is inverted compared to that of the $f_0$ component signal when the amount of the phase shift deviates in the negative direction. Therefore, the phase difference control unit 44 can determine whether the amount of phase shift by the phase shift unit 19 should be increased or decreased (i.e. whether to rotate in the positive side or in the negative side), based on the phase of the $f_0$ component signal detected by the low-frequency detector unit 43.

Figure 14:
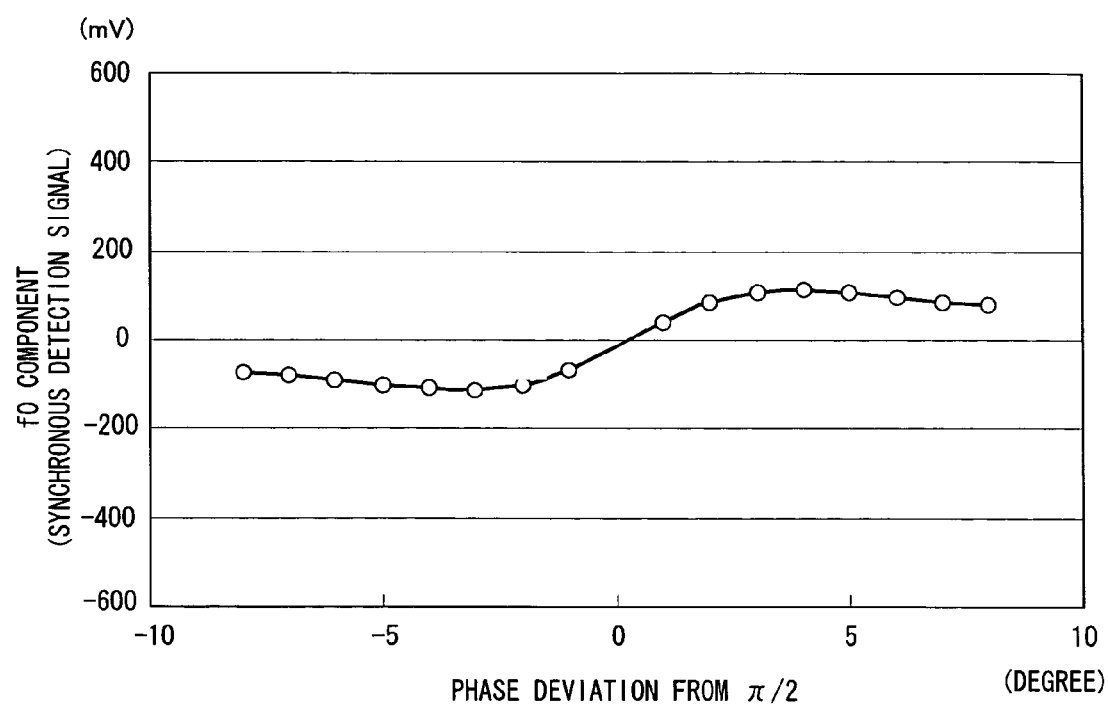
FIG. 14 is a diagram describing a relation between the $f_0$ component and the phase deviation when the output signal of the data modulator unit is monitored.

FIG. 13 and FIG. 14 are diagrams describing a relation between the detected $f_0$ component and the phase deviation. FIG. 13 shows the $f_0$ component when the RZ-DQPSK optical signal is monitored using the photodetector 35, and FIG. 14 shows the $f_0$ component when the DQPSK optical signal is monitored using the photodetector 31.

As shown in FIG. 13 and FIG. 14, particularly in the region where the amount of phase shift is close to "π/2" (i.e. the region where the phase deviation is close to zero), the change in "the power of the $f_0$ component detected by the low-frequency detector unit 43" with respect to "the deviation of the amount of phase shift" is larger when the RZ-DQPSK optical signal output from the intensity modulator 20 is monitored, compared with the change when the DQPSK optical signal output from the data modulator unit 10 is monitored. Consequently, the signal amplitude obtained by the synchronous detection is larger in the configuration using the photodetector 35.

Figure 15:
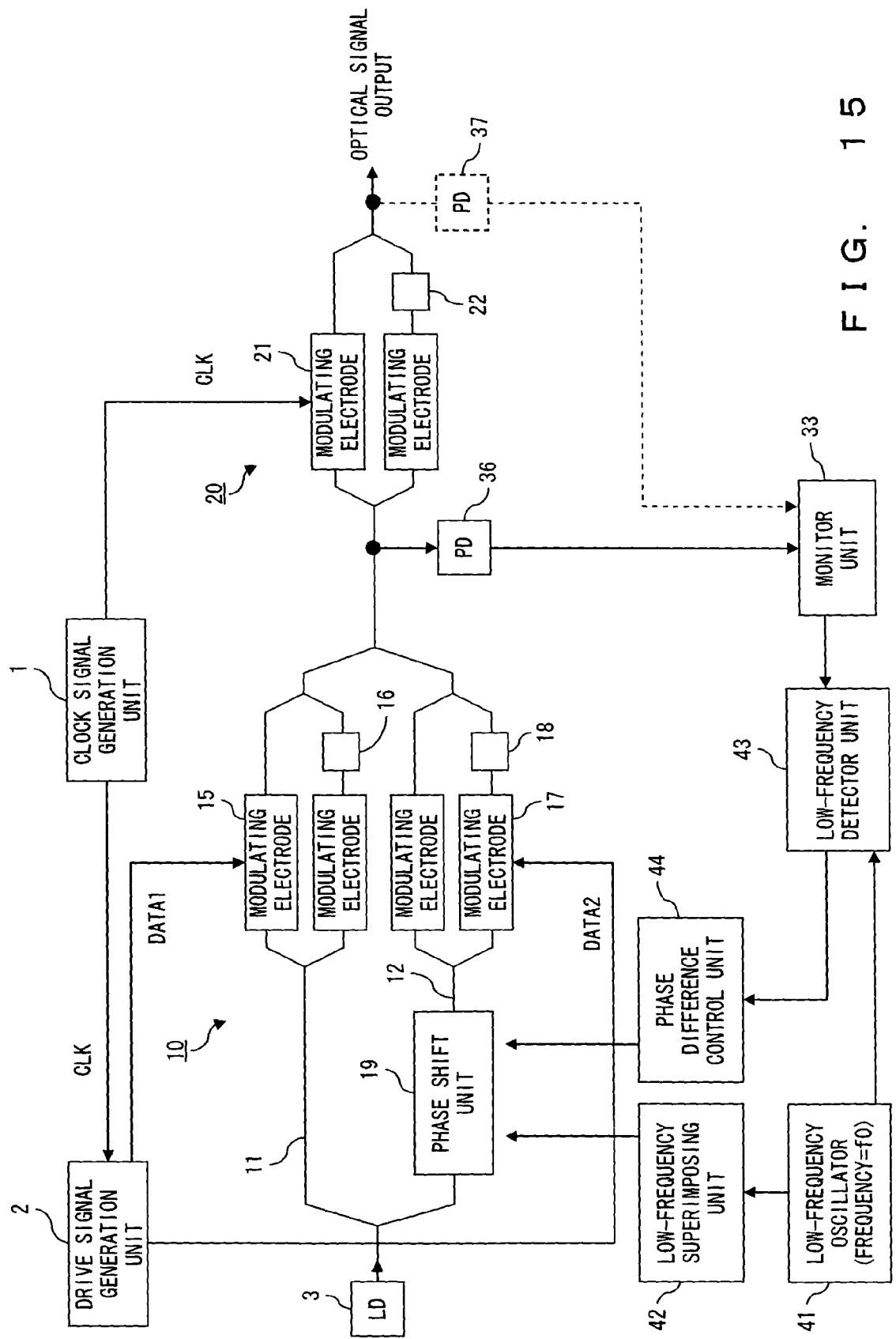
FIG. 15 through FIG. 18 are diagrams showing second through fifth configurations of the optical transmitting apparatus of the second embodiment, respectively.

FIG. 15 is a diagram showing a second configuration of the optical transmitting apparatus of the second embodiment. The optical transmitting apparatus shown in FIG. 15 is realized by replacing the photodetector 31 and the filter 32 comprised in the optical transmitting apparatus shown in FIG. 11 with the photodetector 36 (or by replacing the photodetector 35 and the filter 32 with the photodetector 37). Here, the photodetectors 36 and 37 comprise a cut-off frequency lower than the symbol frequency, as explained with reference to FIG. 10. By so doing, the same function as in the optical transmitting apparatus shown in FIG. 11 can be realized.

Figure 16:
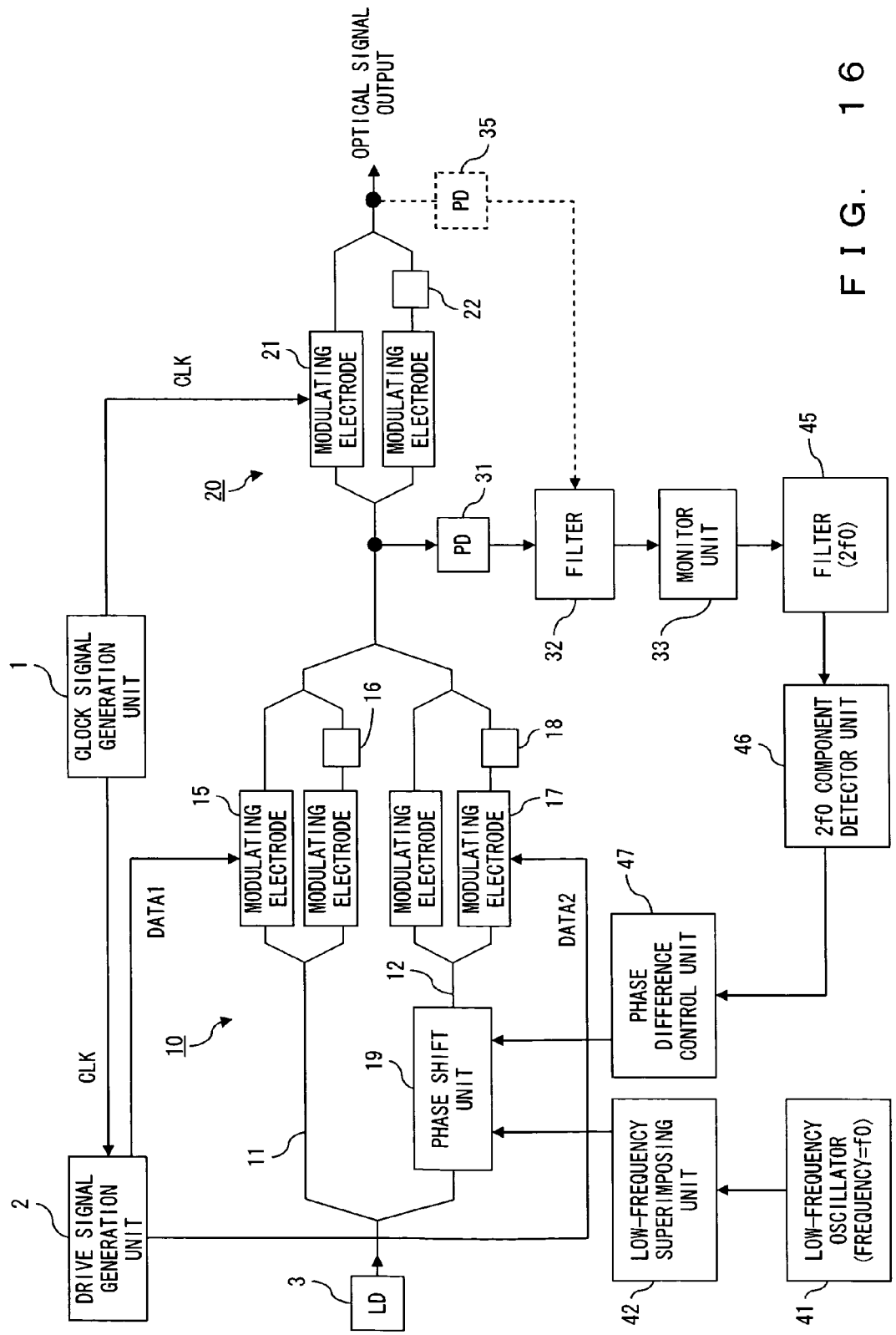

FIG. 16 is a diagram showing a third configuration of the optical transmitting apparatus of the second embodiment. In the third configuration, the amount of phase shift is adjusted using the frequency component $2f_0$ (a frequency twice as high as that of the low-frequency signal generated by the low-frequency oscillator 41).

A filter 45 is a band-pass filter, which passes the frequency component $2f_0$. A $2f_0$ component detector unit 46 detects the amplitude of the output signal of the filter 45. In other words, the $2f_0$ detector unit 46 detects the amplitude of the $2f_0$ component. A phase difference control unit 47 adjusts the amount of phase shift in the phase shift unit 19 so that the amplitude of the $2f_0$ component detected by the $2f_0$ component detector unit 46 becomes maximum. As explained with reference to FIG. 12A-FIG. 12C, the amplitude of the $2f_0$ component becomes maximum when the amount of phase shift in the phase shift unit 19 is "π/2".

Figure 17:
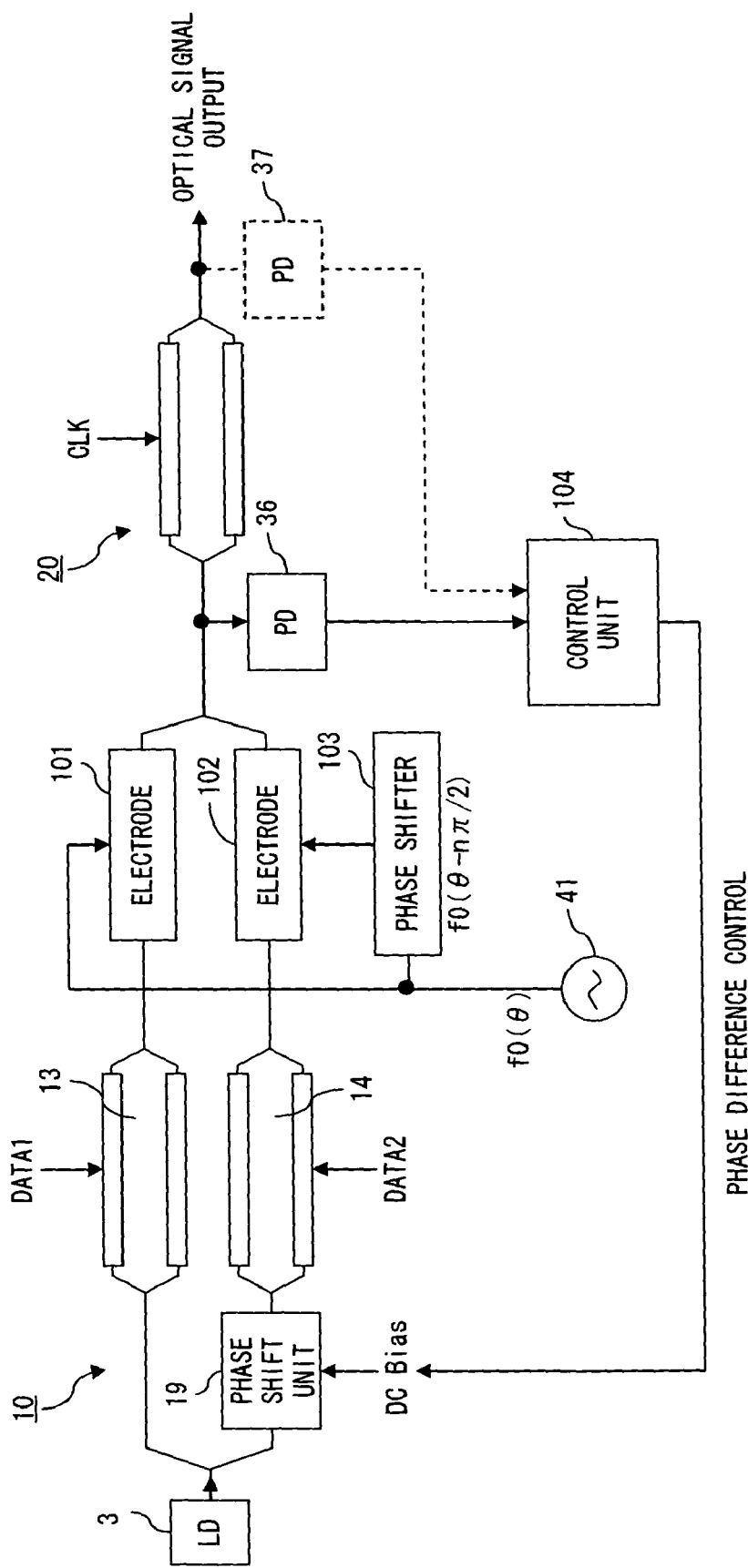

FIG. 17 is a diagram showing a fourth configuration of the optical transmitting apparatus of the second embodiment. In FIG. 17 (also in FIG. 18-FIG. 27), the clock signal generation unit 1 and the drive signal generation unit 2 are omitted. A control unit 104 is equivalent to the monitor unit 33, the low-frequency detector unit 43 and the phase difference control unit 44 shown in FIG. 11. Or, the control unit 104 is equivalent to the filter 45, the $2f_0$ component detector unit 46 and the phase difference control unit 47 shown in FIG. 16.

In the fourth configuration, electrodes 101 and 102 are configured in the later stage of the phase modulators 13 and 14, respectively. A phase shifter 103 generates a pair of low-frequency signal ($f_0$ (θ), $f_0$ (θ−nπ/2)) with a phase difference nπ/2 (where n is a number except for 0 and natural numbers, which are integral multiples of 4) based on the low-frequency signal generated by the low-frequency oscillator 41. One of the low-frequency signals $f_0$ (θ) is provided to the electrode 101, and the other low-frequency signal $f_0$ (θ−nπ/2) is provided to the electrode 102. By so doing, the low-frequency signal $f_0$ (θ) is superimposed on the modulated optical signal output from the phase modulator 13, and the low-frequency signal $f_0$ (θ−nπ/2) is superimposed on the modulated optical signal output from the phase modulator 14.

In the first through the third configurations, the low-frequency signal is provided to the phase shift unit 19. On the other hand, in the fourth configuration, a pair of the low-frequency signals is provided to the electrodes 101 and 102. In the fourth configuration, it is confirmed that the amount of phase shift can be adjusted by the same operation as in the first and the third configurations.

Figure 18:
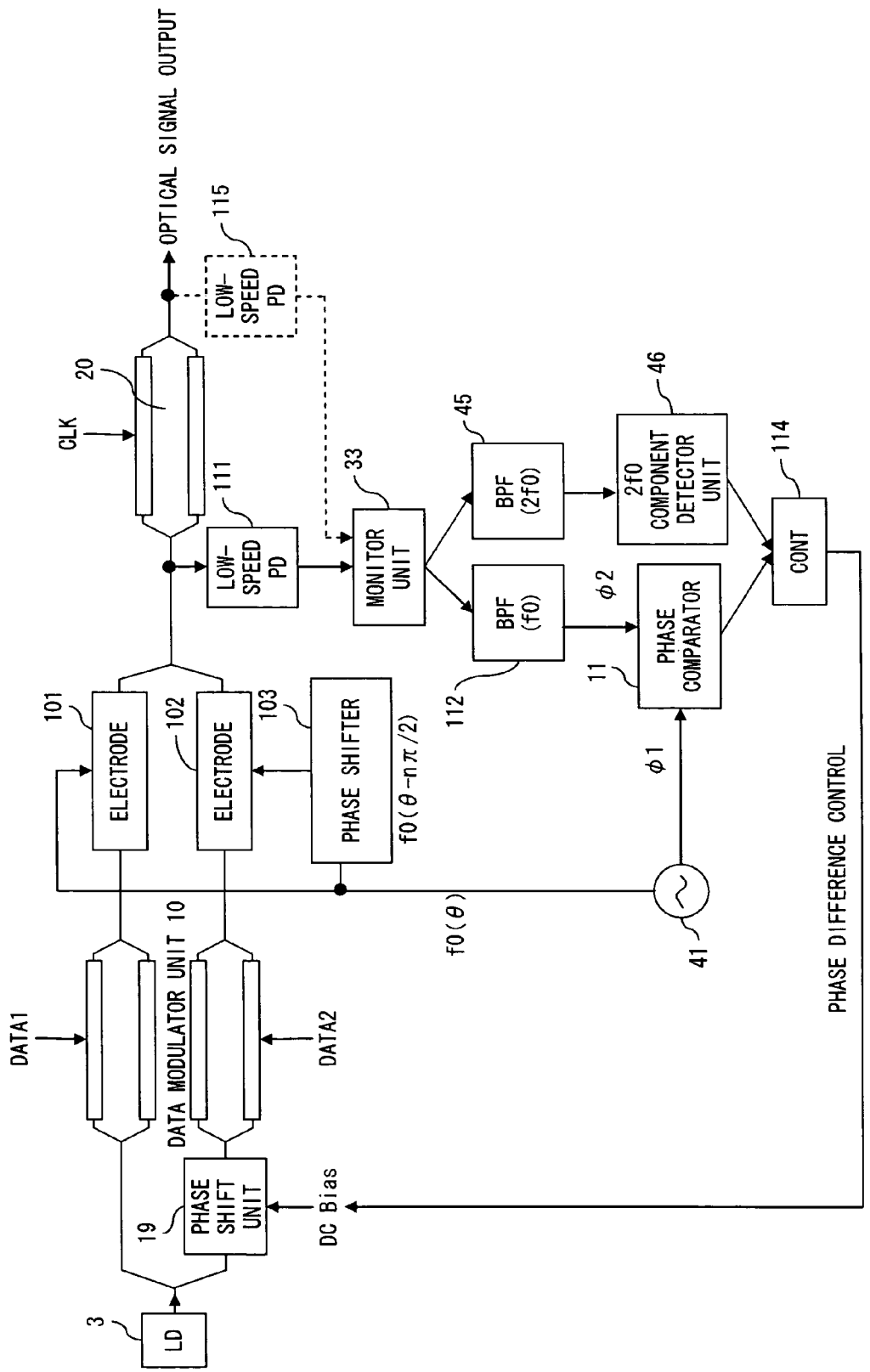

FIG. 18 is a diagram showing a fifth configuration of the optical transmitting apparatus of the second embodiment. In the fifth configuration, the amount of phase shift is adjusted using both of the frequency component $f_0$ and the frequency component $2f_0$.

A low-speed photodetector 111 converts the DQPSK optical signal output from the data modulator unit 10 into an electrical signal. Here, the low-frequency signal $f_0$ has been superimposed on the DQPSK optical signal. The low-speed photodetector 111 comprises a band (or response speed), which enables detection of the frequency twice as high as the frequency of the low-frequency signal generated by the low-frequency oscillator 41 (for example, several kHz through several MHz). It is also possible to use a low-speed photodetector 115 for converting the RZ-DQPSK optical signal output from the intensity modulator 20 into an electrical signal instead of using the low-speed photodetector 111.

A filter 112 is a band-pass filter, which passes the frequency component $f_0$. A phase comparator 113 performs synchronous detection for comparing the phase φ1 of the low-frequency signal generated by the low-frequency oscillator 41 with the phase φ2 of the low-frequency signal output from the filter 112, and detects the sign (or polarity) of the phase of the output signal from the filter 112. At that time, it is possible that, if the phase φ1 and the phase φ2 have the same sign, for example, the phase comparator 113 outputs a sign signal indicating "positive", and if signs of the phase φ1 and the phase φ2 opposite to each other, the phase comparator 113 outputs a sign signal indicating "negative". The filter 45 and the $2f_0$ component detector unit 46 are the same as explained with reference to FIG. 16, and detect the amplitude of the $2f_0$ component.

A control unit 114 adjusts the amount of phase shift in the phase shift unit 19 based on the output of the phase comparator 113 and the $2f_0$ component detector unit 46. Practically, the control unit 114, for example, determines whether the DC bias should be increased or decreased based on the sign detected by the phase comparator 113 when adjusting the amount of phase shift so that the amplitude of the $2f_0$ component detected by the $2f_0$ component detector unit 46 becomes maximum.

Figure 19:
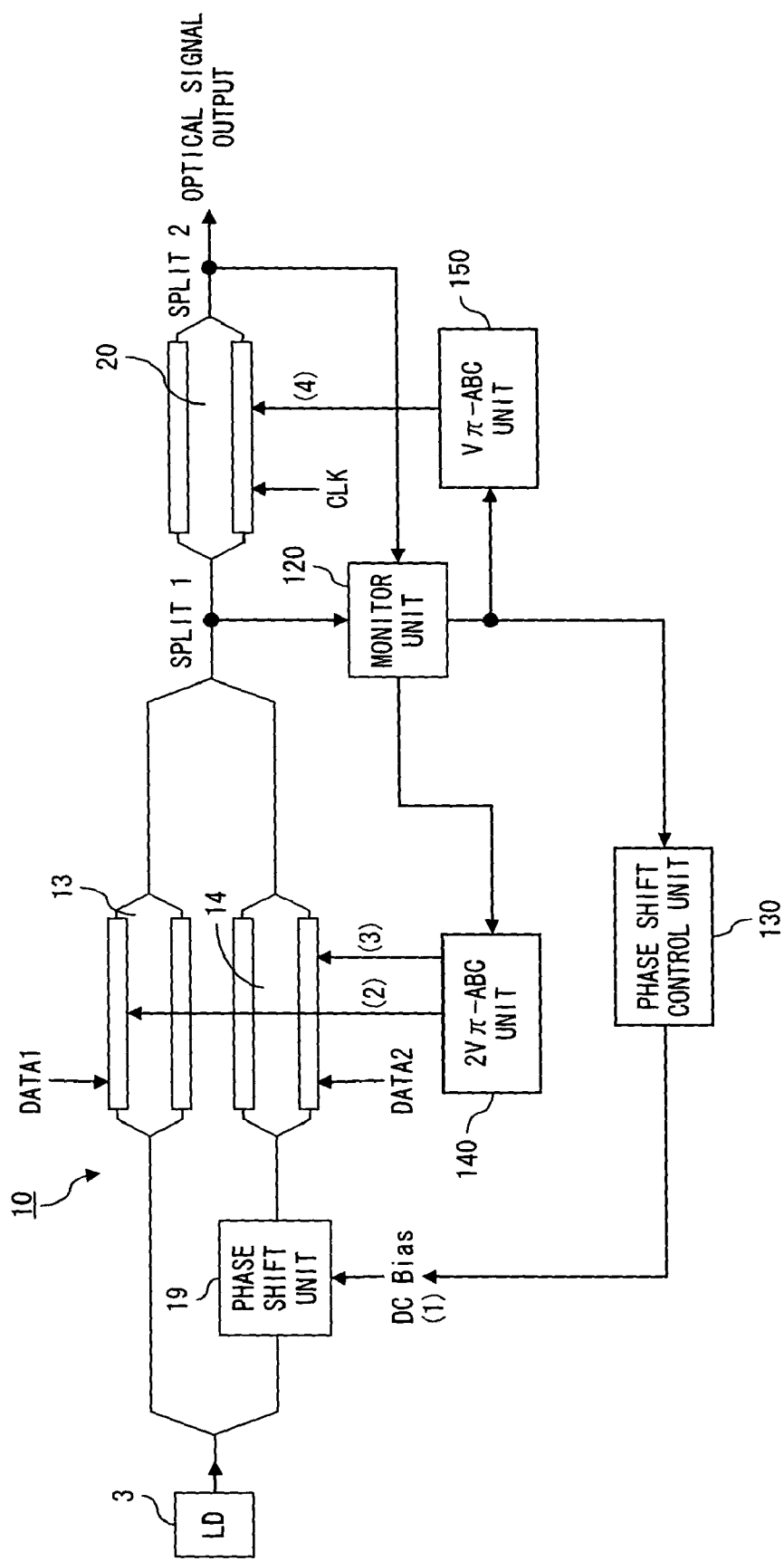
FIG. 19 is a diagram showing sixth and seventh configurations of the optical transmitting apparatus of the second embodiment.

FIG. 19 is a diagram showing sixth and seventh configurations of the optical transmitting apparatus of the second embodiment. In the sixth and the seventh configurations, in addition to the adjustment of the amount of phase shift in the phase shift unit 19, compensation for the DC drift in the phase modulators 13 and 14 (deviation in the operating point of a Mach-Zehnder type modulator) and compensation for the DC drift in the intensity modulator 20 are performed. In FIG. 19, though not shown in the drawing, a low-frequency signal is superimposed on an optical signal as in the first through the fifth configurations.

A monitor unit 120 monitors the low-frequency signal included in the DQPSK optical signal output from the data modulator unit 10 and/or the RZ-DQPSK optical signal output from the intensity modulator 20. A phase shift control unit 130, based on the monitoring result of the monitor unit 120, adjusts the amount of phase shift in the phase shift unit 19 using a control signal (1). The operation of the phase shift control unit 130 is the same as explained with reference to FIG. 11 through FIG. 18. A 2Vπ-ABC (Automatic Bias Control) unit 140, based on the monitoring result by the monitor unit 120, generates control signals (2) and (3) for compensating for the DC drift in the phase modulators 13 and 14. Details of the operation and the configuration of the 2Vπ-ABC unit are described in Japanese Patent Application Laid-open Publication No. 2000-162563, for example. A Vπ-ABC unit 150, based on the monitoring result by the monitor unit 120, generates a control signal (4) for compensating for the DC drift in the intensity modulator 20. The operation of the Vπ-ABC is the heretofore know art.

Figure 20:
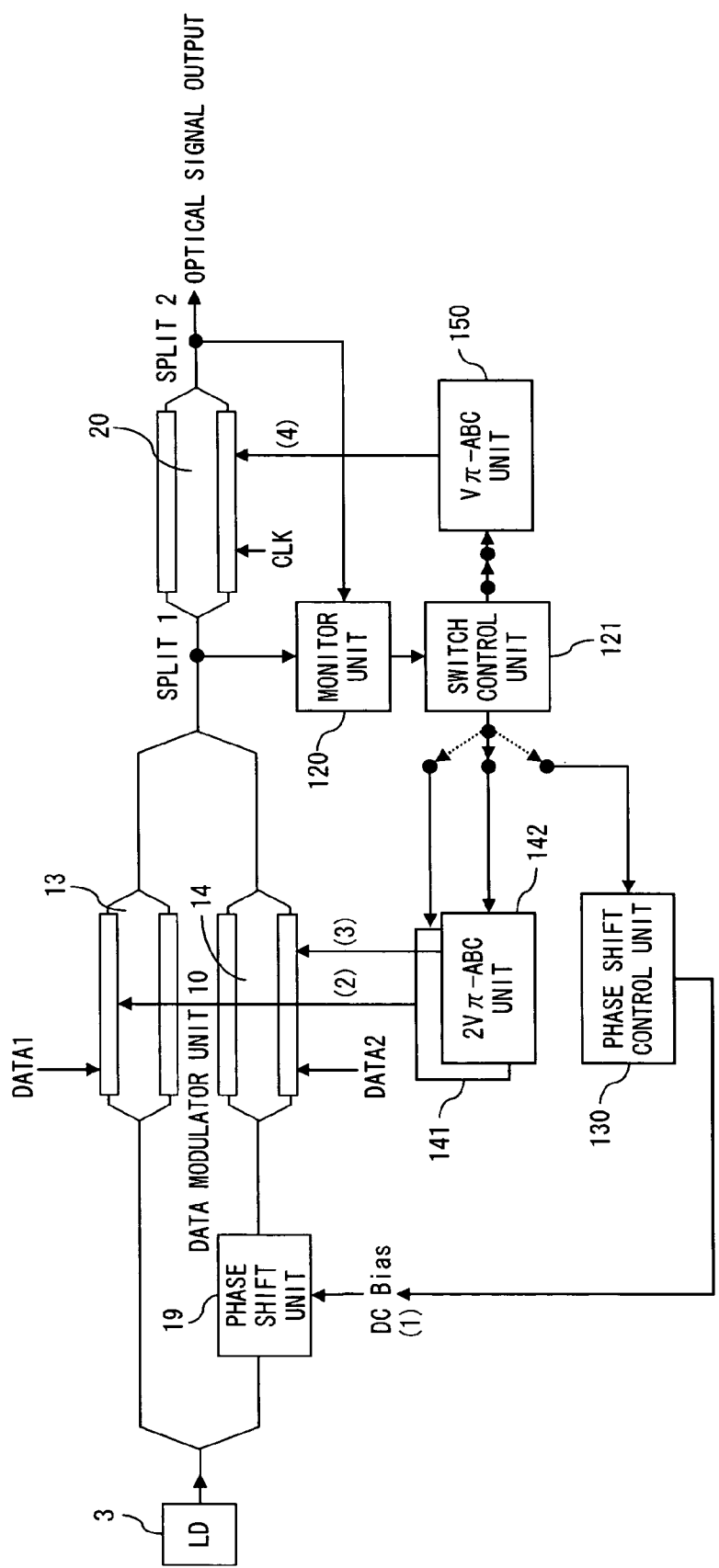
FIG. 20 is a diagram explaining the operation of the control system of the sixth configuration of the optical transmitting apparatus of the second embodiment.

FIG. 20 is a diagram explaining the operation of the control system of the sixth configuration of the optical transmitting apparatus of the second embodiment. In the sixth configuration, adjustment and compensation are performed by the time-division method. In other words, the monitor unit 120 performs a monitoring operation for adjusting the amount of the phase shift, a monitoring operation for compensating for the DC drift in the phase modulators 13 and 14, and a monitoring operation for compensating for the DC drift in the intensity modulator 20 by the time-division method. A switch control unit 121 sequentially switches the forwarding destinations (the phase shift control unit 130, 2Vπ-ABC units 141 and 142, and the Vπ-ABC unit 150) of the monitoring result by the monitor unit 120. The phase shift control unit 130, 2Vπ-ABC units 141 and 142, and the VπC-ABC unit 150, based on the provided monitoring result, generate the control signals (1)-(4) by the time-division method. The low-frequency signal $f_0$ is generated in the switch control unit 121, for example. In such a case, the low-frequency signal $f_0$ may be superimposed on the control signal (1) and provided to the phase shift unit 19, for example, may be superimposed on the control signals (2) and (3) and provided to the phase modulators 3 and 4, respectively, and may be superimposed on the control signal (4) and provided to the intensity modulator 20.

Figure 21:
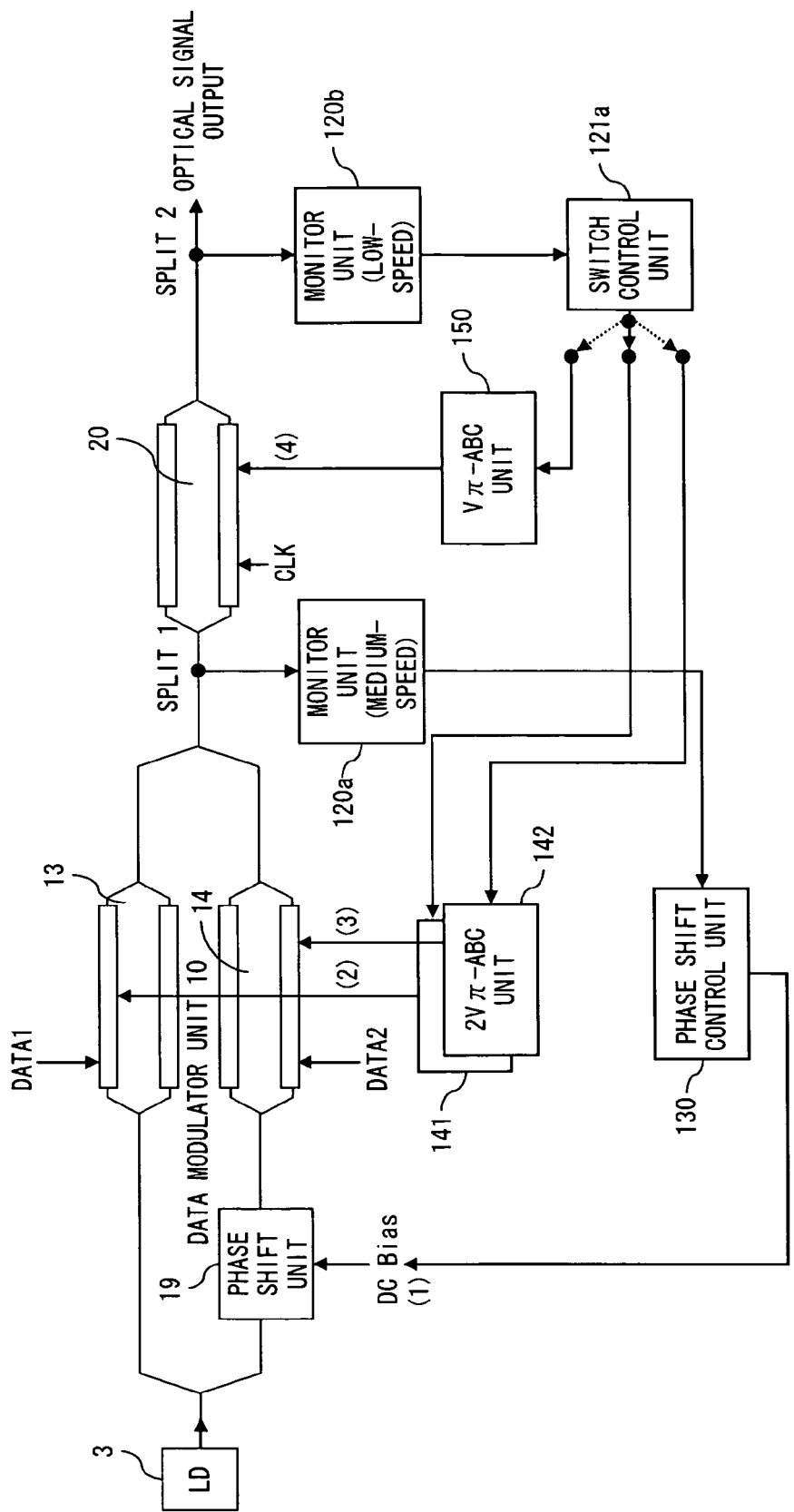
Figure 23:
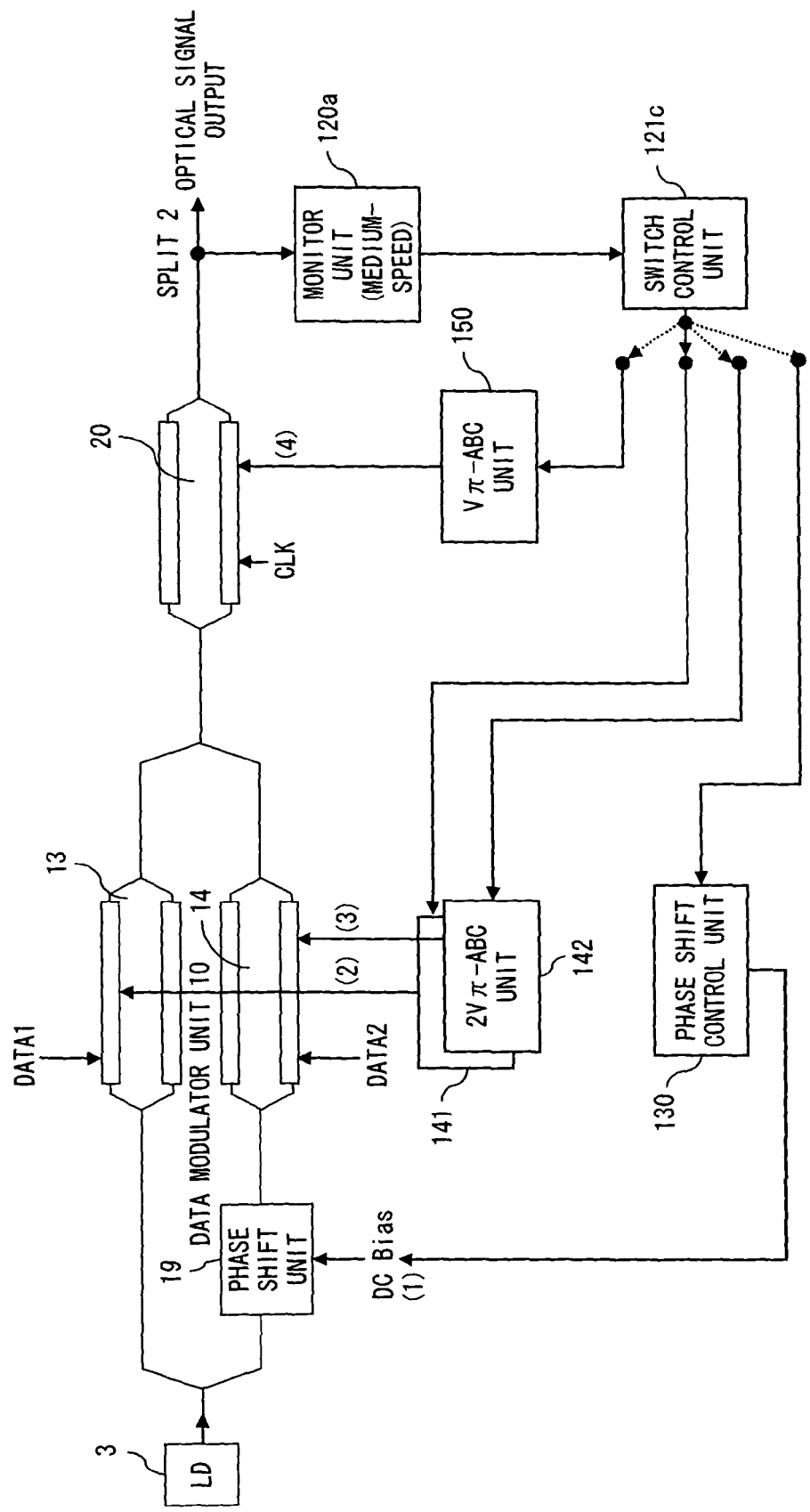

FIG. 21 through FIG. 23 are examples of implementation of the sixth configuration. In the optical transmitting apparatus shown in FIG. 21, a monitor unit 120a is a medium-speed photodetector comprising a band of several tens of MHz through several GHz, and detects a prescribed continuous frequency components lower than the symbol frequency. The monitor unit 120a is equivalent to a combination of the photodetector 31 and the filter 32, or the photodetector 36. The phase shift control unit 130 generates the control signal (1) based on the monitoring result by the monitor unit 120a. By so doing, the amount of phase shift in the phase shift unit 19 can be adjusted. A monitor unit 120b is a low-speed photodetector comprising a band of several kHz through several MHz, and detects the low-frequency signal $f_0$. The switch control unit 121a sequentially switches the forwarding destinations of the monitoring result by the monitor unit 120b (2Vπ-ABC units 141 and 142, and the Vπ-ABC unit 150). The 2Vπ-ABC units 141 and 142, and the Vπ-ABC unit 150, based on the provided monitoring result, generate the control signals (2)-(4) by the time-division method.

In the optical transmitting apparatus shown in FIG. 22, a switch control unit 121b sequentially switches the forwarding destinations of the monitoring result by the monitor unit 120a (the phase shift control unit 130, and the 2Vπ-ABC units 141 and 142). The phase shift control unit 130, and the 2Vπ-ABC units 141 and 142, based on the provided monitoring result, generate the control signals (1)-(3) by the time-division method. The Vπ-ABC unit 150, based on the monitoring result by the monitor unit 120b, generates the control signal (4).

In the optical transmitting apparatus shown in FIG. 23, a switch control unit 121c sequentially switches the forwarding destinations of the monitoring result by the monitor unit 120a (the phase shift control unit 130, the 2Vπ-ABC units 141 and 142, and the Vπ-ABC unit 150). Here, the monitor unit 120a monitors the optical output of the intensity modulator 20. The phase shift control unit 130, the 2Vπ-ABC units 141 and 142, and the Vπ-ABC unit 150, based on the provided monitoring result, generate the control signals (1)-(4) by the time-division method.

Figure 24:
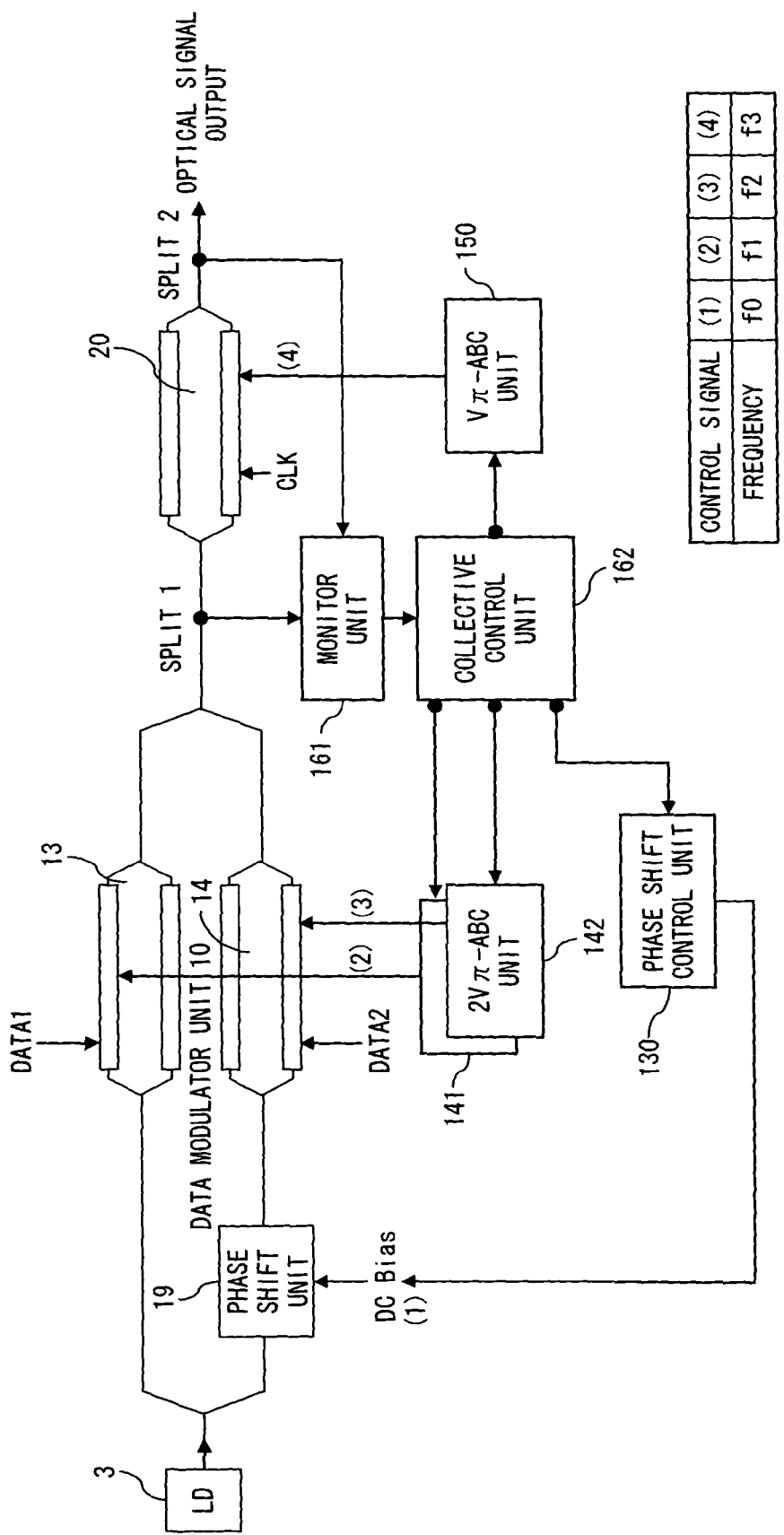
FIG. 24 is a diagram explaining the operation of the control system of the seventh configuration of the optical transmitting apparatus of the second embodiment.

FIG. 24 is a diagram explaining the operation of the control system of the seventh configuration of the optical transmitting apparatus of the second embodiment. In the seventh configuration, adjustment of the amount of phase shift and the DC drift is performed using a plurality of low-frequency signals with different frequencies. Practically, the amount of phase shift in the phase shift unit 19 is adjusted using the low-frequency signal with frequency $f_0$, the DC drift of the phase modulator 13 is adjusted using the low-frequency signal with frequency $f_1$, the DC drift of the phase modulator 14 is adjusted using the low-frequency signal with frequency $f_2$, and the DC drift of the intensity modulator 20 is adjusted using the low-frequency signal with frequency $f_3$. All of the frequencies $f_0$-$f_3$ are selected within a range from several kHz to several MHz. The low-frequency signal $f_0$ is superimposed on the control signal (1) and provided to the phase shift unit 19, the low-frequency signals $f_1$ and $f_2$ are superimposed on the control signals (2) and (3), respectively, and provided to the phase modulators 13 and 14, respectively, and the low-frequency signal $f_3$ is superimposed on the control signal (4) and provided to the intensity modulator 20.

A monitor unit 161 monitors the frequency components $f_0$-$f_3$ (or $2f_0$-$2f_3$) in parallel. A collective control unit 162 forwards each of the monitoring results obtained by the monitor unit 161 to the phase shift control unit 130, the 2Vπ-ABC units 141 and 142, and the Vπ-ABC unit 150. Then, the phase shift control unit 130, the 2Vπ-ABC units 141 and 142, and the Vπ-ABC unit 150, based on the provided monitoring result, generate the control signals (1)-(4). According to this configuration, adjustment of the amount of phase shift and compensation for the DC drift can be performed simultaneously.

Figure 26:
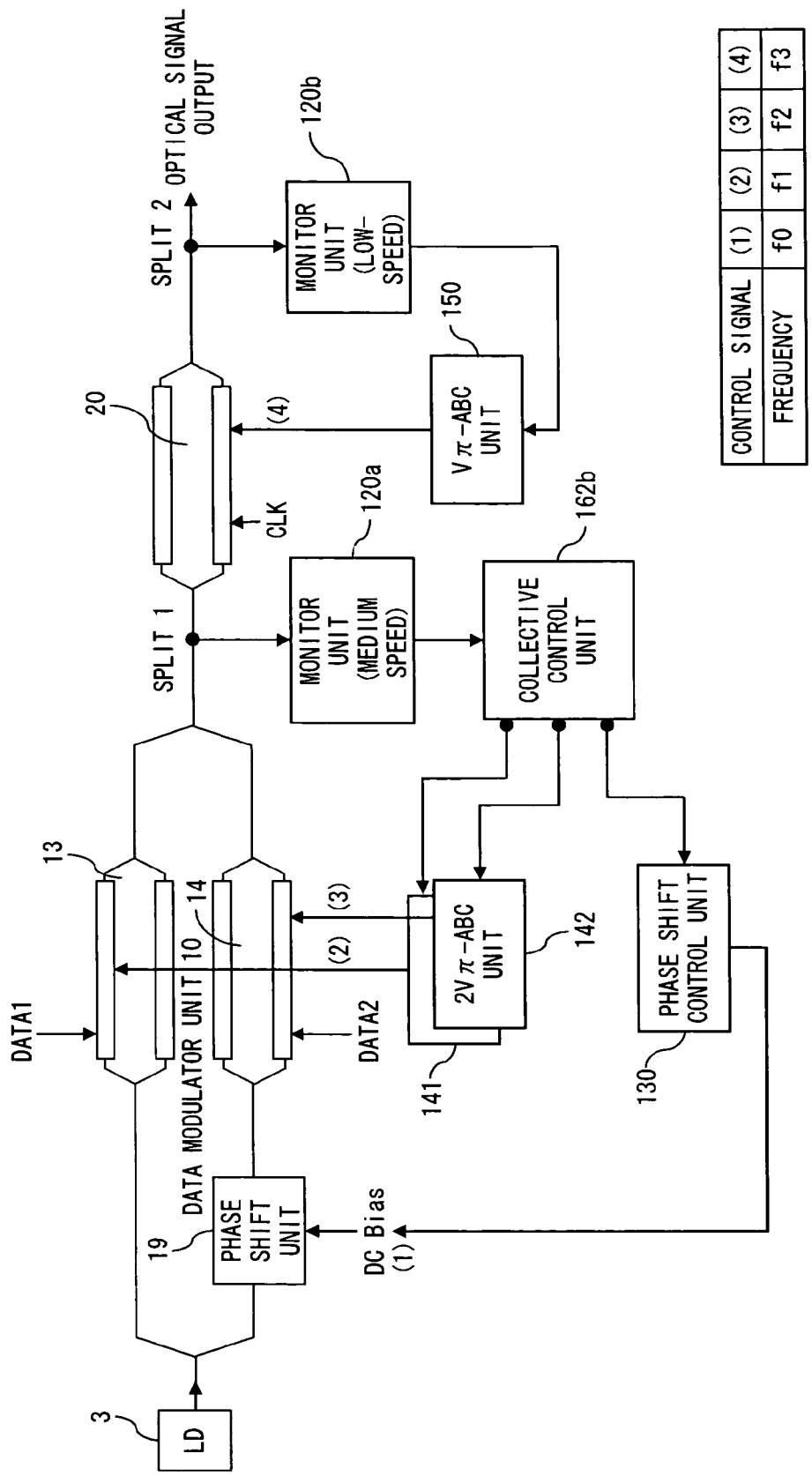
Figure 27:
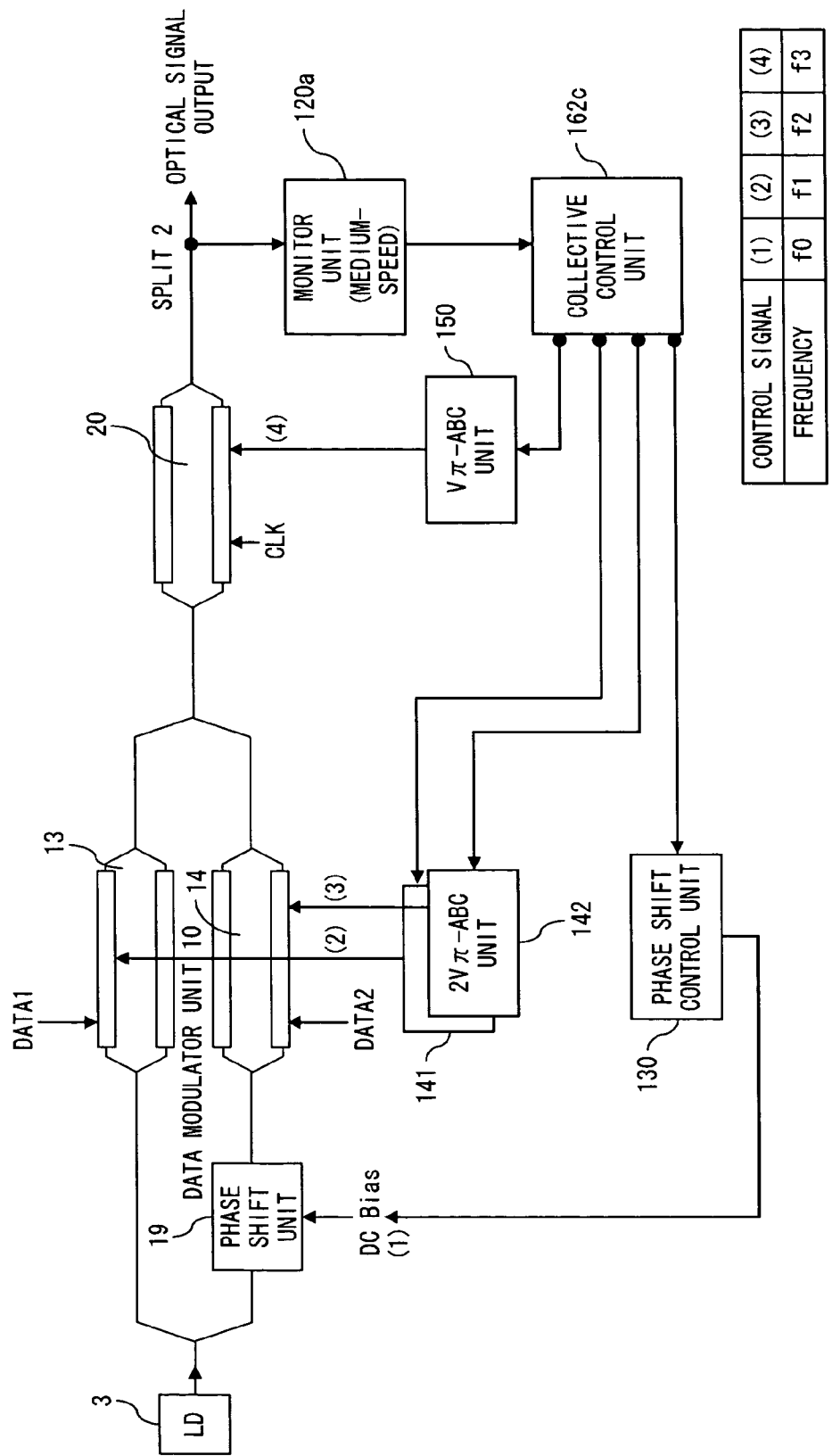

FIG. 25-FIG. 27 are examples of implementation of the seventh configuration. In the optical transmitting apparatus shown in FIG. 25, the phase shift control unit 130, based on the monitoring result by the monitor unit 120a, generates the control signal (1). By so doing, the amount of phase shift in phase shift unit 19 can be adjusted. In addition, the collective control unit 162a informs the 2Vπ-ABC units 141 and 142, and the Vπ-ABC unit 150 of the monitoring result by the monitor unit 120b. The 2Vπ-ABC units 141 and 142, and the Vπ-ABC unit 150, based on the provided monitoring result, generate the control signals (2)-(4).

In the optical transmitting apparatus shown in FIG. 26, the collective control unit 162b provides the monitoring result by the monitor unit 120a to the phase shift control unit 130 and the 2Vπ-ABC units 141 and 142. The phase shift control unit 130 and the 2Vπ-ABC units 141 and 142, based on the provided monitoring result, generate the control signals (1)-(3). The Vπ-ABC unit 150, based on the monitoring result by the monitor unit 120b, generates the control signal (4).

In the optical transmitting apparatus shown in FIG. 27, the collective control unit 162c provides the monitoring result by the monitor unit 120a to the phase shift control unit 130, the 2Vπ-ABC units 141 and 142, and the Vπ-ABC unit 150. Here, the monitor unit 120a monitors the optical output of the intensity modulator 20. The phase shift control unit 130, the 2Vπ-ABC units 141 and 142, and the Vπ-ABC unit 150, based on the provided monitoring result, generate the control signals (1)-(4).

Although the time-division system for sequentially generating the control signals (1)-(4), and the frequency-division system for generating the control signals (1)-(4) simultaneously using the low-frequency signals with different frequencies are presented in FIG. 20-FIG. 27, these systems can be combined.

Third Embodiment

Figure 28:
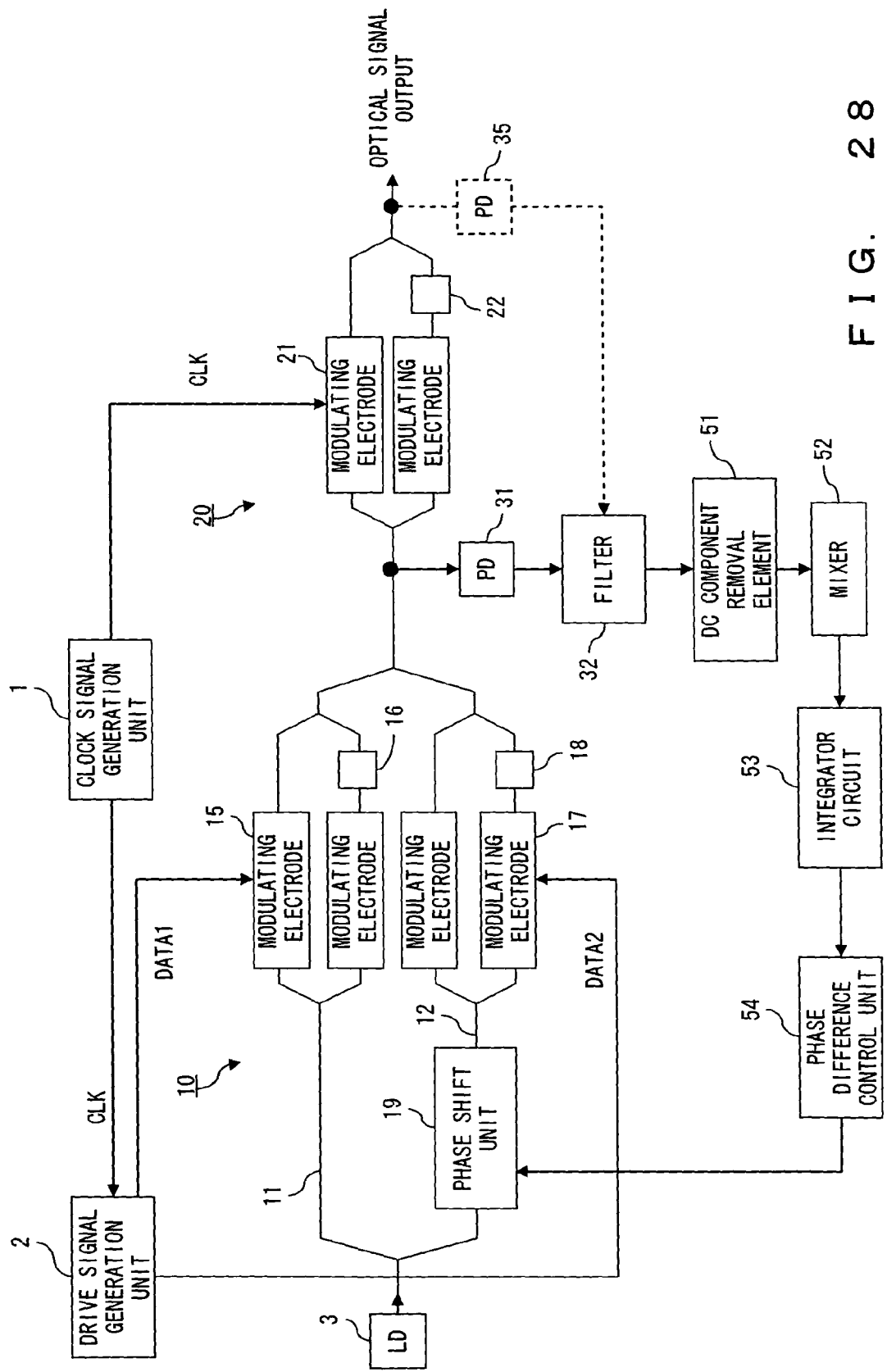
FIG. 28 and FIG. 29 are diagrams showing first and second configurations of the optical transmitting apparatus of the third embodiment of the present invention, respectively.
Figure 29:
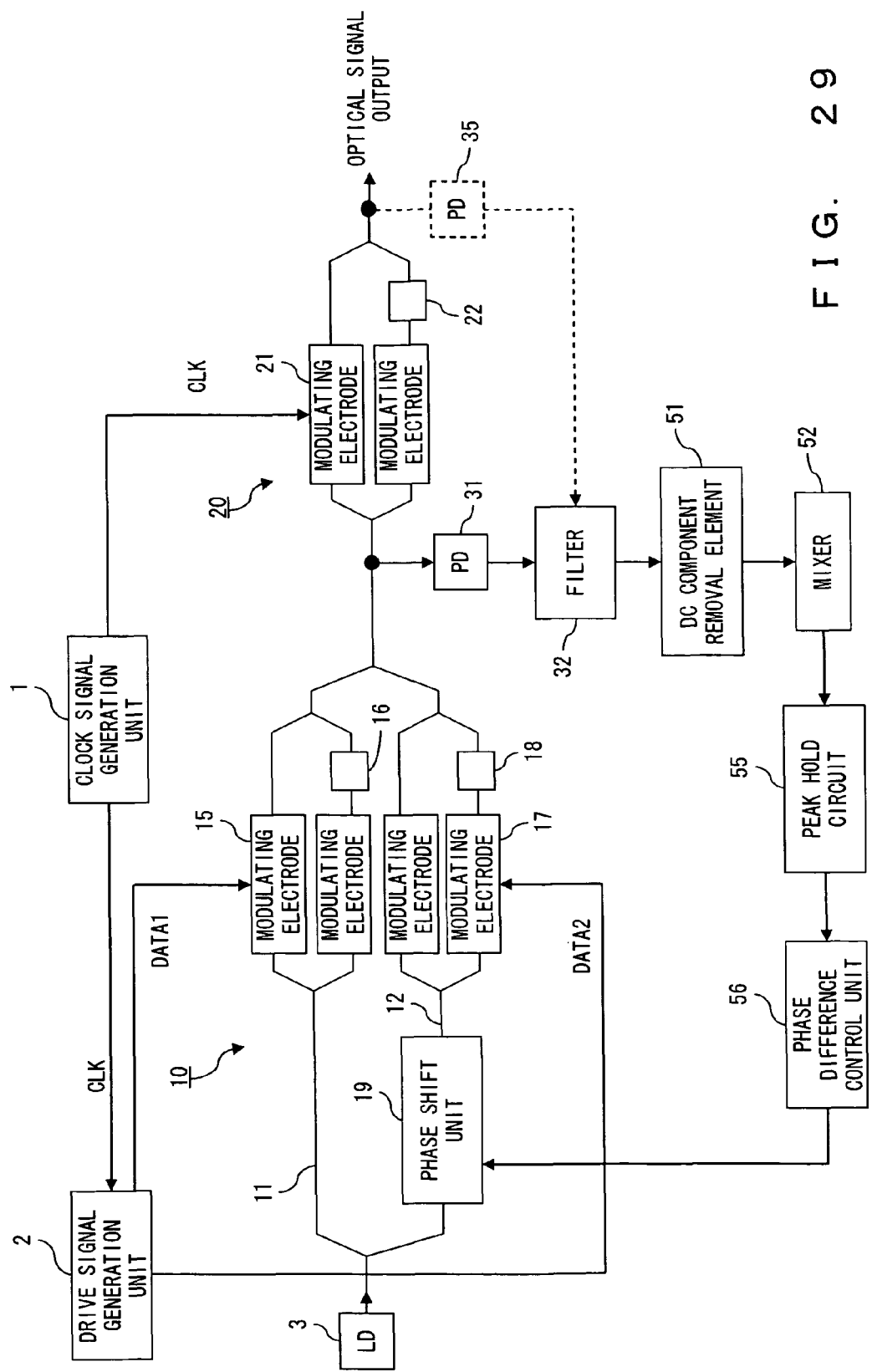

FIG. 28 is a diagram showing a first configuration of the optical transmitting apparatus of the third embodiment of the present invention. FIG. 29 is a diagram showing a second configuration of the optical transmitting apparatus of the third embodiment of the present invention. The numerical references in common among FIG. 5, FIG. 28 and FIG. 29 indicate the same elements. Either of the photodetector 31 or the photodetector 35 can be used as a photodetector.

In FIG. 28, a DC component removal element 51 is, for example, a condenser, and removes the DC component from the output signal of the filter 32. A mixer 52 squares the output signal of the DC component removal element 51. Here, the mixer circuit 52 is not limited in particular; however, is realized by an analog multiplier circuit comprising a Gilbert cell, for example. In such a case, a squared signal is obtained by multiplying the output signal of the DC component removal element 51 by itself using the analog multiplier circuit. An integrator circuit 53 integrates the squared signal output from the mixer 52. An integration time is from several thousand to several tens of thousand times of the symbol time, for example. The integrator circuit 53 repeatedly executes the integration operation. A phase difference control unit 54 adjusts the amount of phase shift in the phase shift unit 19 based on the integration result obtained by the integrator circuit 53.

The optical transmitting apparatus of the second configuration shown in FIG. 29 comprises a peak hold circuit 55 instead of the integrator circuit 53 shown in FIG. 28. The peak hold circuit 55 detects a peak value of the squared signal output from the mixer 52. A sampling time is from several thousand to several tens of thousand times of the symbol time, for example. The peak hold circuit 55 repeatedly executes the sampling/hold operation. A phase difference control unit 56 adjusts the amount of phase shift in the phase shift unit 19 based on the peak value obtained by the peak hold circuit 55.

FIG. 30A is a diagram showing a waveform of the output signal of the mixer 52 (i.e. the squared signal). FIG. 30B is a diagram showing the relation between the amount of phase shift and average power of the squared signal. The average power of the squared signal is equivalent to the integrated value obtained by the integrator circuit 53.

As shown in these drawings, the average power of the squared signal output from the mixer 52 is minimum when the amount of phase shift in the phase shift unit 19 is exactly "π/2" (i.e. when the deviation of the amount of phase shift in the phase shift unit 19 is zero). As the deviation from "π/2" becomes large, the average power of the squared signal becomes larger. Therefore, by periodically calculating an integrated value or an average value of the squared signal output from the mixer 52, and performing a feedback control so that the calculated value becomes minimum, the amount of phase shift in the phase shift unit 19 can be converged on "π/2".

In the optical transmitting apparatus shown in FIG. 28, the amount of phase shift can be adjusted without configuring the DC component removal element 51. In such a case, the mixer 52 squares the output signal of the filter 32. By so doing, an integrated value or an average value of the squared signal depends on the amount of phase shift in the phase shift unit 19, and reaches minimum when the amount of phase shift is "π/2". Consequently, the amount of phase shift can be properly adjusted by the same feedback control. However, when the squared signal is generated in a state that the DC component still remains, a change in the integrated value or the average value of the squared signal with respect to the change in the amount of phase shift becomes small. Therefore, the adjustment accuracy of the amount of phase shift can be higher in the configuration with the DC component removal element 51.

The integrated value or the average value of the output signal of the filter 32 is a constant value regardless of the amount of phase shift. The integrated value or the average value of the output signal of the DC component removal element 51 is zero regardless of the amount of phase shift.

FIG. 30C is a diagram showing the relation between the amount of phase shift and the peak power of the squared signal. The peak power of the squared signal is detected by the peak hold circuit 55 shown in FIG. 29.

The peak power of the squared signal output from the mixer 52 becomes minimum when the amount of phase shift in the phase shift unit 19 is exactly "π/2". As the deviation from "π/2" becomes large, the peak power of the squared signal becomes larger. Consequently, by periodically calculating the peak power of the squared signal output from the mixer 52, and by performing a feedback control so that the calculated value becomes minimum, the amount of phase shift in the phase shift unit 19 can be converged on "π/2".

In the optical transmitting apparatus shown in FIG. 29, even when the DC component removal element 51 is not configured, the peak power of the squared signal depends on the amount of phase shift in the phase shift unit 19, and becomes minimum when the amount of phase shift is "π/2". In other words, in the optical transmitting apparatus shown in FIG. 29, the amount of phase shift can be properly adjusted without the DC component removal element 51.

As shown in FIG. 6A and FIG. 8A, the optical peak power of the RZ-DQPSK optical signal or the DQPSK optical signal is minimum when the amount of phase shift is "π/2". Therefore, if a detection system of the optical signal (a photodetector element and a peak hold circuit etc.) can keep up with the symbol rate, it is possible to adjust the amount of phase shift in accordance with the optical peak power of the RZ-DQPSK optical signal or the DQPSK optical signal.

Variations of the Embodiments

In the data modulator unit 10, the phase shift unit 19 can be configured in the former stage of the phase modulator 13 or 14, or can be configured in the later stage of the phase modulator 13 or 14.

In the optical transmitting apparatus of the embodiments, the intensity modulator 20 can be configured in the later stage of the data modulator unit 10 or in the former stage of the data modulator unit 10.

In the optical transmitting apparatus of the embodiments, a part of the DQPSK optical signal output from the data modulator unit 10 is split and directed to the photodetector 31 (or the photodetector 36). Or a part of the RZ-DQPSK optical signal output from the intensity modulator 20 is split and directed to the photodetector 35 (or the photodetector 37). At that time, these optical signals are, for example, split by an optical splitter and are directed to the corresponding photodetector. However, the "splitting" of the optical signal in the present invention is not limited to a configuration using an optical splitter; however, a configuration, in which an emission leaked from a coupled part of the optical waveguide is directed to the photodetector, is also possible. A technique for monitoring optical leak of an MZ modulator is described in Japanese Patent Application Laid-open Publication No. H10-228006. When the output side waveguide of the data modulator unit 10 or the intensity modulator 20 is coupled with an X-coupler (intersecting waveguide), it is possible to direct a reverse phase optical signal to the photodetector as well as outputting the in-phase optical signal as a main signal. An X-coupler optical modulator is described in Japanese Patent Application Laid-open Publication No. 2001-244896, for example.

The photodetectors (31, 35, 36 and 37) for detecting the DQPSK optical signal or the RZ-DQPSK optical signal may be incorporated in the modulators (the data modulator unit 10 or the intensity modulator 20), or may be configured outside of the modulators.

The amount of phase shift in the phase shift unit 19 can be adjusted by, for example, changing the refractive index of the optical waveguide. In such a case, the refractive index of the optical waveguide can be adjusted by, for example, arranging a thin-film heater etc. adjacent to the optical waveguide to change the temperature of the optical waveguide, or by arranging a piezoelectric element etc. for applying appropriate voltage to give stress to the waveguide, or for applying voltage to induce an electro-optic effect (Pockels effect).

Although the phase shift unit 19 is configured in one of the optical waveguides of the interferometer in the above embodiments, it can be configured in both of a pair of the waveguides. In such a case, by making the applied voltage and the temperature provided to the phase shift unit (the electrodes, the thin-film heater, piezoelectric elements and others) configured in a pair of waveguides asymmetrical, the relative phase difference can be provided.

When the intensity modulator 20 performs CSRZ (Carrier Suppressed Return to Zero) modulation, a 2Vπ-ABC unit is used instead of a Vπ-ABC unit 150 in FIG. 19 through FIG. 27.

In FIG. 28 and FIG. 29, it is possible to obtain the same effect as described above by using an absolute-value circuit instead of the mixer 52. The absolute-value circuit is a circuit for performing full-wave rectification of the signal output from the DC component removal circuit, and though it is not limited in particular, it is realized by, for example, a full-wave rectifier circuit in which a plurality of diodes are connected, or by a full-wave rectifier circuit formed by using an operational amplifier.

In addition, in the above embodiments, DQPSK modulation is mainly explained; however, the control of the present invention is applicable to the QPSK modulation without any modification. The present invention is also applicable to $2^n$PSK ($n \geq 3$) or QAM. However, when applying to these modulations, for example, multi-level data with four or more values should be used as a data signal input to the data modulation unit.

What is claimed is:

1. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

an extraction unit to extract at least a part of continuous frequency components except for a given frequency from a modulated optical signal in order to detect a change of spectrum of the modulated optical signal, the modulated optical signal being obtained by coupling the first and the second optical signals modulated by said data modulator unit, and the given frequency being an integral multiple of a symbol frequency; and a phase difference control unit to control said phase shift unit using the continuous frequency components extracted by said extraction unit, wherein said extraction unit comprises:

a photodetector to detect the modulated optical signal; and a filter to pass the at least a part of the continuous frequency components except for the given frequency, which is an integral multiple of the symbol frequency, from an output signal of said photodetector, and wherein said filter is a band-pass filter with a cut-off frequency lower than the symbol frequency.

2. The optical transmitting apparatus according to claim 1, wherein said phase difference control unit controls the amount of phase shift in said phase shift unit so as to minimize power of the frequency component extracted by said extraction unit.

3. The optical transmitting apparatus according to claim 1, wherein the modulated optical signal is a QPSK (Quadrature Phase Shift Keying) optical signal or a DQPSK (Differential Quadrature Phase Shift Keying) optical signal, and said phase difference control unit controls the amount of phase difference in said phase shift unit so that a phase difference of $n\pi/2$ is given between the first and the second optical signals, where n is an odd number.

4. An optical communication system comprising:

an optical transmitting apparatus according to claim 1; and an optical receiving apparatus to receive an optical signal transmitted from said optical transmitting apparatus.

5. The optical transmitting apparatus according to claim 1, further comprising:

a superimposing unit to superimpose a low-frequency signal on at least one of the first and the second optical signals; and a detection unit to detect the low-frequency signal component included in the continuous frequency components extracted by said extraction unit, wherein said phase difference control unit controls said phase shift unit so as to minimize the detected low-frequency signal component.

6. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

an intensity modulator to generate an RZ modulated optical signal by performing an intensity modulation on an optical signal obtained by coupling the first and the second optical signals modulated by said data modulator unit;

an extraction unit to extract at least a part of continuous frequency components except for a given frequency, which is an integral multiple of a symbol frequency, from the RZ modulated optical signal in order to detect a change of spectrum of the RZ modulated optical signal; and a phase difference control unit to control said phase shift unit using the continuous frequency components extracted by said extraction unit, wherein said extraction unit comprises:

a photodetector to detect the modulated optical signal; and a filter to pass the at least a part of the continuous frequency components except for the given frequency, which is an integral multiple of the symbol frequency, from an output signal of said photodetector, and wherein said filter is a band-pass filter with a cut-off frequency lower than the symbol frequency.

7. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

a superimposing unit to superimpose a low-frequency signal on at least one of the first and the second optical signals;

an extraction unit to extract at least a part of frequency components except for a given frequency from the modulated optical signal;

a detection unit to detect at least one of an amplitude or a phase of a harmonic signal of the low-frequency signal included in the frequency component extracted by said extraction unit; and a phase difference control unit to control said phase shift unit using the detection result of said detection unit, wherein said extraction unit comprises:

a photodetector to detect the modulated optical signal; and a filter to pass the at least a part of the continuous frequency components except for the given frequency, which is an integral multiple of the symbol frequency, from an output signal of said photodetector, and wherein said filter is a band-pass filter with a cut-off frequency lower than the symbol frequency.

8. The optical transmitting apparatus according to claim 7, wherein said phase difference control unit controls the amount of phase shift in said phase shift unit so as to minimize the amplitude of the low-frequency signal detected by said detection unit.

9. The optical transmitting apparatus according to claim 7, wherein said phase difference control unit controls the amount of phase shift in said phase shift unit so as to maximize the amplitude of a second harmonic wave of the low-frequency signal detected by said detection unit.

10. The optical transmitting apparatus according to claim 7, wherein said phase difference control unit determines whether the amount of phase shift in said phase shift unit is increased or decreased based on a phase of the low-frequency signal detected by said detection unit.

11. The optical transmitting apparatus according to claim 7, wherein said superimposing unit superimposes the low-frequency signal on either one of the first optical signal or the second optical signal alone.

12. The optical transmitting apparatus according to claim 7, wherein said superimposing unit superimposes a pair of low-frequency signals with a phase difference on the first optical signal and the second optical signal.

13. The optical transmitting apparatus according to claim 7, wherein a control of the amount of phase shift in said phase shift unit, a control for compensating for DC drift of said data modulator unit, and a control for compensating for DC drift of an intensity modulator configured in the later stage of said data modulator unit are performed in a time-division method using a low-frequency signal with the same frequency.

14. The optical transmitting apparatus according to claim 7, wherein a control of the amount of phase shift in said phase shift unit, a control for compensating for DC drift of said data modulator unit, and a control for compensating for DC drift of an intensity modulator configured in the later stage of said data modulator unit are performed in parallel using low-frequency signals with different frequencies.

15. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

a photodetector to detect a part of a modulated optical signal obtained by coupling the first and second optical signals modulated by said data modulator unit;

a squaring circuit to square an output signal of said photodetector;

a phase difference control unit to control said phase shift unit using an output signal of said squaring circuit;

a DC component removal unit, provided between said photodetector and said squaring circuit, to remove a DC component from an output signal of said photodetector; and a peak hold circuit to hold a peak value of the squaring circuit for a time period, wherein said phase difference control unit controls said phase shift unit using the peak value held by said peak hold circuit.

16. The optical transmitting apparatus according to claim 15, wherein said phase difference control unit controls said phase shift unit using the result of integration of an output signal of said squaring circuit for a time period.

17. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

an extraction unit to extract at least a part of continuous frequency components except for a given frequency from a modulated optical signal in order to detect a change of spectrum of the modulated optical signal, the modulated optical signal being obtained by coupling the first and the second optical signals modulated by said data modulator unit, and the given frequency being an integral multiple of a symbol frequency; and a phase difference control unit to control said phase shift unit using the continuous frequency components extracted by said extraction unit, wherein said extraction unit comprises:
a photodetector to detect the modulated optical signal; and
a filter to pass the at least a part of the continuous frequency components except for the given frequency, which is an integral multiple of the symbol frequency, from an output signal of said photodetector, and further comprising
a DC component removal unit, provided at a later stage of the filter, to remove DC component of an output of the filter.

18. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

an intensity modulator to generate an RZ modulated optical signal by performing an intensity modulation on an optical signal obtained by coupling the first and the second optical signals modulated by said data modulator unit;

an extraction unit to extract at least a part of continuous frequency components except for a given frequency, which is an integral multiple of a symbol frequency, from the RZ modulated optical signal in order to detect a change of spectrum of the RZ modulated optical signal; and a phase difference control unit to control said phase shift unit using the continuous frequency components extracted by said extraction unit, wherein said extraction unit comprises:
a photodetector to detect the modulated optical signal; and
a filter to pass the at least a part of the continuous frequency components except for the given frequency, which is an integral multiple of the symbol frequency, from an output signal of said photodetector, and further comprising
a DC component removal unit, provided at a later stage of the filter, to remove DC component of an output of the filter.

19. An optical transmitting apparatus for transmitting a modulated optical signal corresponding to a data signal, comprising:

a phase shift unit to control a phase of at least one of a first optical signal and a second optical signal, obtained by splitting an optical input, so that the first and the second optical signals have a phase difference on an optical waveguide;

a data modulator unit to modulate the first and second optical signals using the data signal on the optical waveguide;

a superimposing unit to superimpose a low-frequency signal on at least one of the first and the second optical signals;

an extraction unit to extract at least a part of frequency components except for a given frequency from the modulated optical signal;

a detection unit to detect at least one of an amplitude or a phase of a harmonic signal of the low-frequency signal included in the frequency component extracted by said extraction unit; and a phase difference control unit to control said phase shift unit using the detection result of said detection unit, wherein said extraction unit comprises:
a photodetector to detect the modulated optical signal; and
a filter to pass the at least a part of the continuous frequency components except for the given frequency, which is an integral multiple of the symbol frequency, from an output signal of said photodetector, and further comprising
a DC component removal unit, provided at a later stage of the filter, to remove DC component of an output of the filter.

* * * * *